United States Patent [19]

Bair et al.

[11] Patent Number: 4,969,414

[45] Date of Patent: Nov. 13, 1990

[54] APPARATUS FOR TREATING CORES

[75] Inventors: Eugene C. Bair, Holland, Mich.; Frederick C. Burke, Fort Wayne, Ind.

[73] Assignee: General Electric Company, Fort Wayne, Ind.

[21] Appl. No.: 407,856

[22] Filed: Sep. 15, 1989

Related U.S. Application Data

[62] Division of Ser. No. 743,382, Jun. 10, 1985.

[51] Int. Cl.$^5$ .............................................. B05C 5/00
[52] U.S. Cl. ........................................ 118/668; 29/596; 118/322; 118/669
[58] Field of Search ................. 29/596; 427/104, 116; 118/320, 322, 668

[56] References Cited

U.S. PATENT DOCUMENTS

| | | | |
|---|---|---|---|
| 1,273,947 | 7/1918 | Stevenson | 198/803.9 |
| 1,856,757 | 5/1932 | Goad | 118/320 |
| 2,334,087 | 11/1943 | Goebel et al. | 118/322 |
| 2,425,652 | 8/1947 | Starkey | 118/322 |
| 2,572,515 | 10/1951 | Poole et al. | 118/322 |
| 2,574,686 | 11/1951 | Brown | 427/116 |
| 2,701,544 | 2/1955 | Lantz | 118/64 |
| 3,283,742 | 11/1966 | Fuchs et al. | 118/322 |
| 3,476,231 | 11/1969 | Bower | 198/19 |
| 3,513,808 | 5/1970 | Mortimer et al. | 118/322 |
| 3,527,662 | 9/1970 | Elsworth | 427/8 |
| 3,782,325 | 1/1974 | Farnsworth et al. | 118/322 |
| 4,286,707 | 9/1981 | Menzies | 198/859 |
| 4,380,967 | 4/1983 | Matt | 118/669 |
| 4,485,126 | 11/1984 | Gaietto et al. | 427/116 |
| 4,527,510 | 7/1985 | Arndt | 118/669 |
| 4,565,718 | 1/1986 | Katsuyama et al. | 118/320 |
| 4,574,460 | 3/1986 | Bair | 29/559 |

FOREIGN PATENT DOCUMENTS

| | | | |
|---|---|---|---|
| 560096 | 2/1931 | Fed. Rep. of Germany | 198/832.1 |
| 0082049 | 5/1985 | Japan | 427/116 |

*Primary Examiner*—Willard Hoag
*Attorney, Agent, or Firm*—Ralph E. Krisher, Jr.

[57] ABSTRACT

An apparatus for treating cores has an endless conveyor operable with discrete intermittent movements between a plurality of preselected positions defined in a predetermined course of the endless conveyor with a preselected dwell period between each of the discrete intermittent movements, respectively. A set of drives for the endless conveyor includes a coupler associated with each drive for engagement with the endless conveyor only during the preselected dwell periods, and means for intermittently moving the drives only when the couplers are engaged with the endless conveyor, respectively.

50 Claims, 19 Drawing Sheets

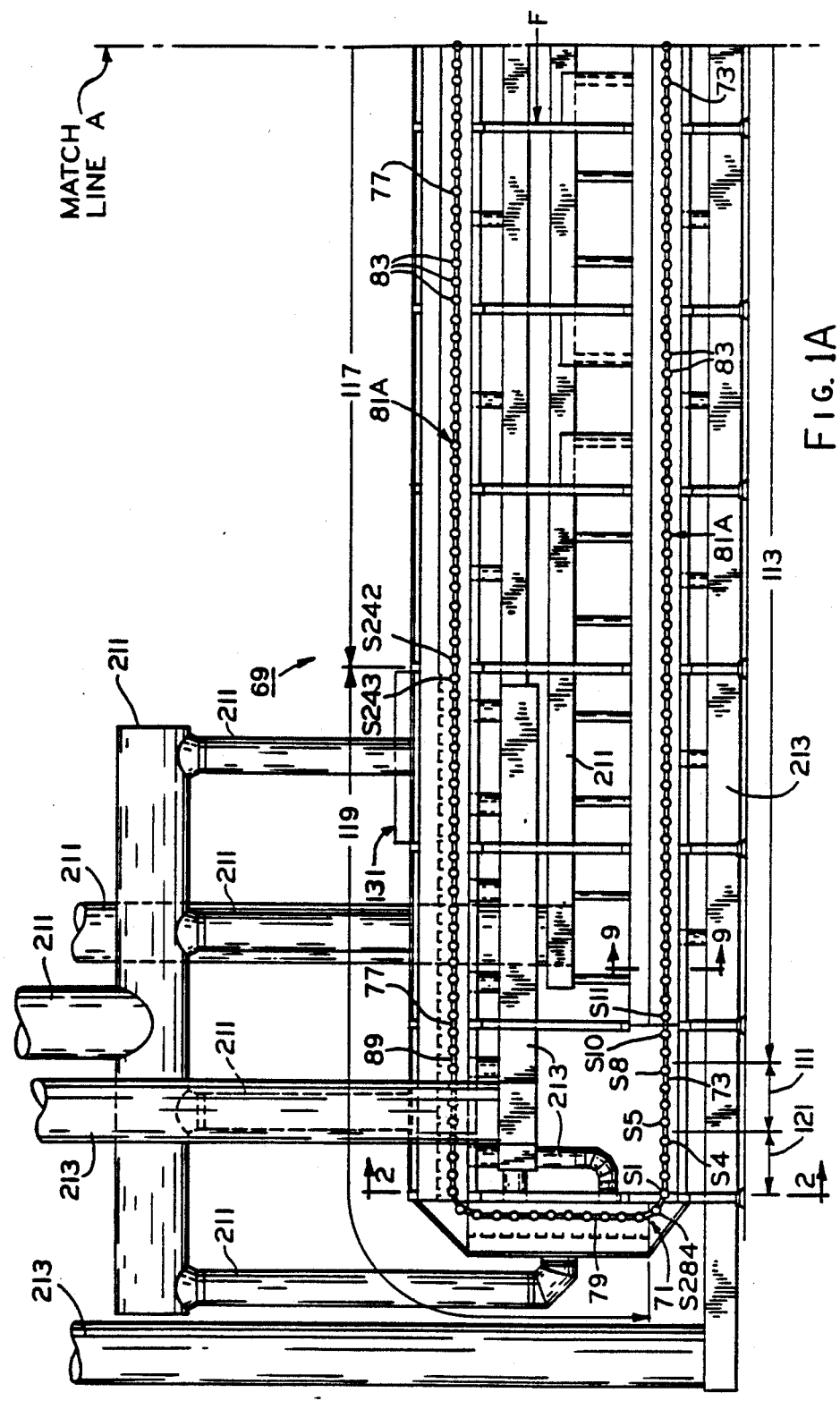

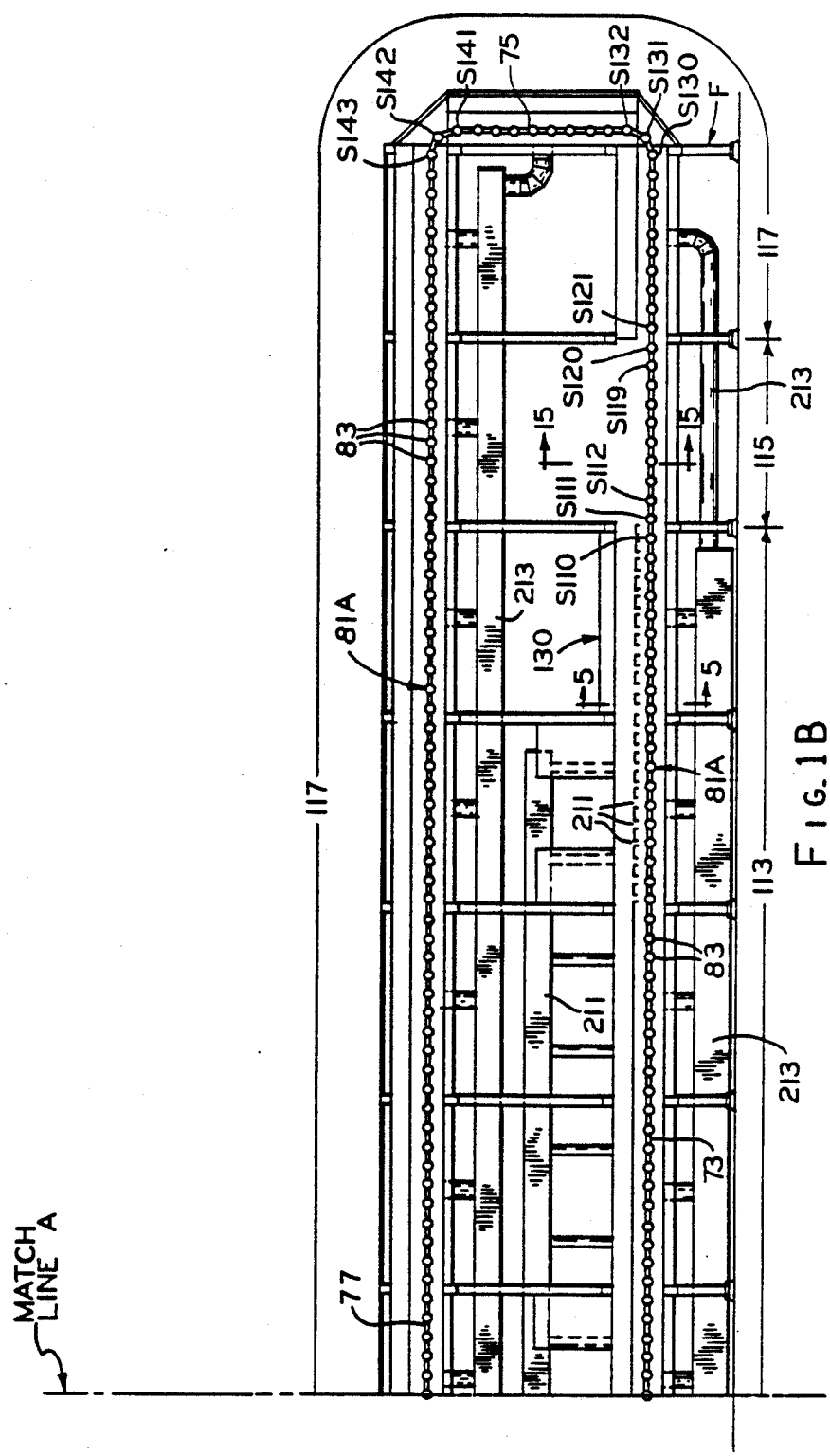

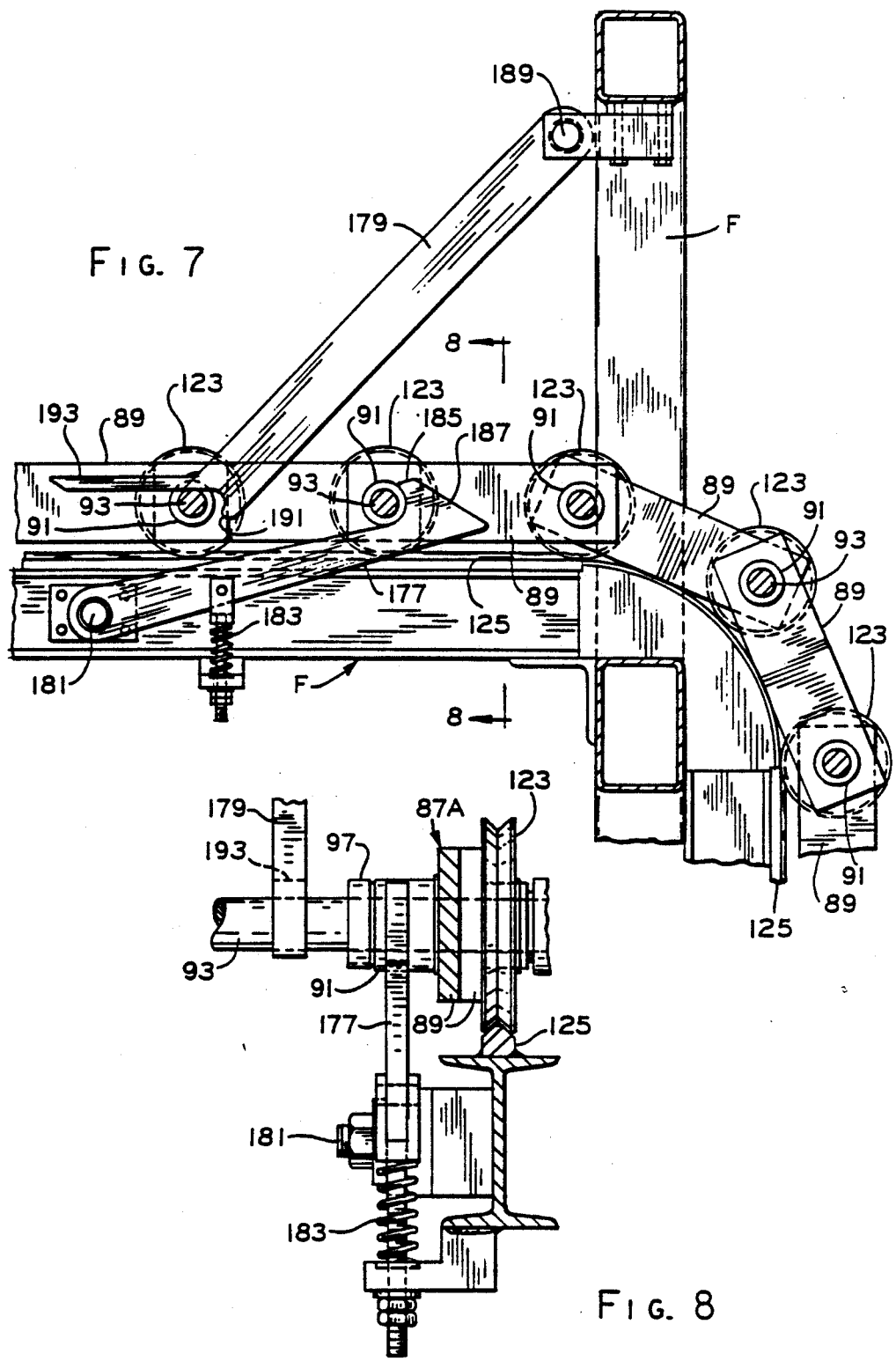

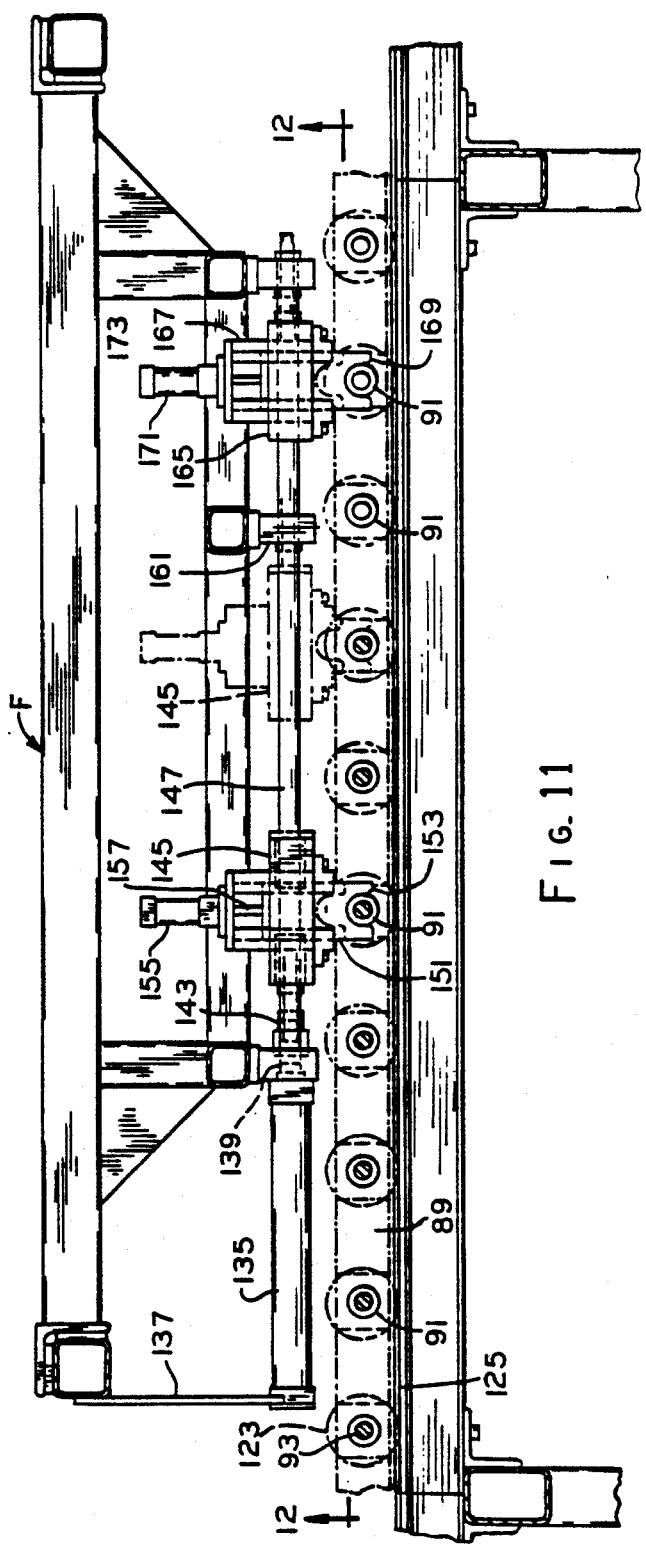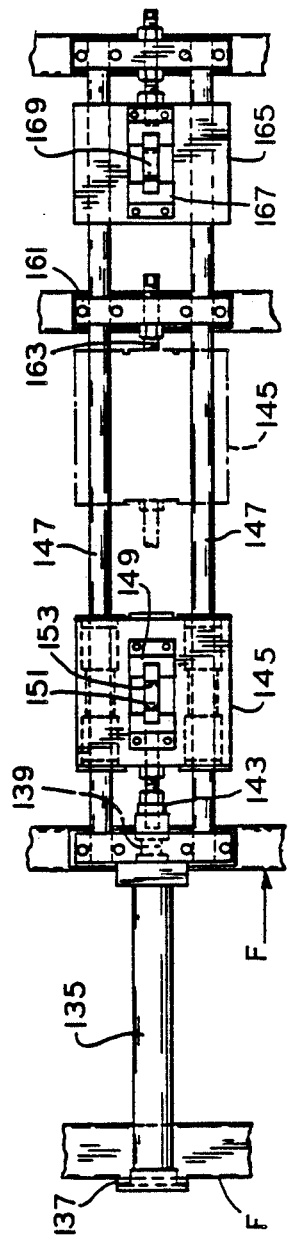
FIG. 11
FIG. 12

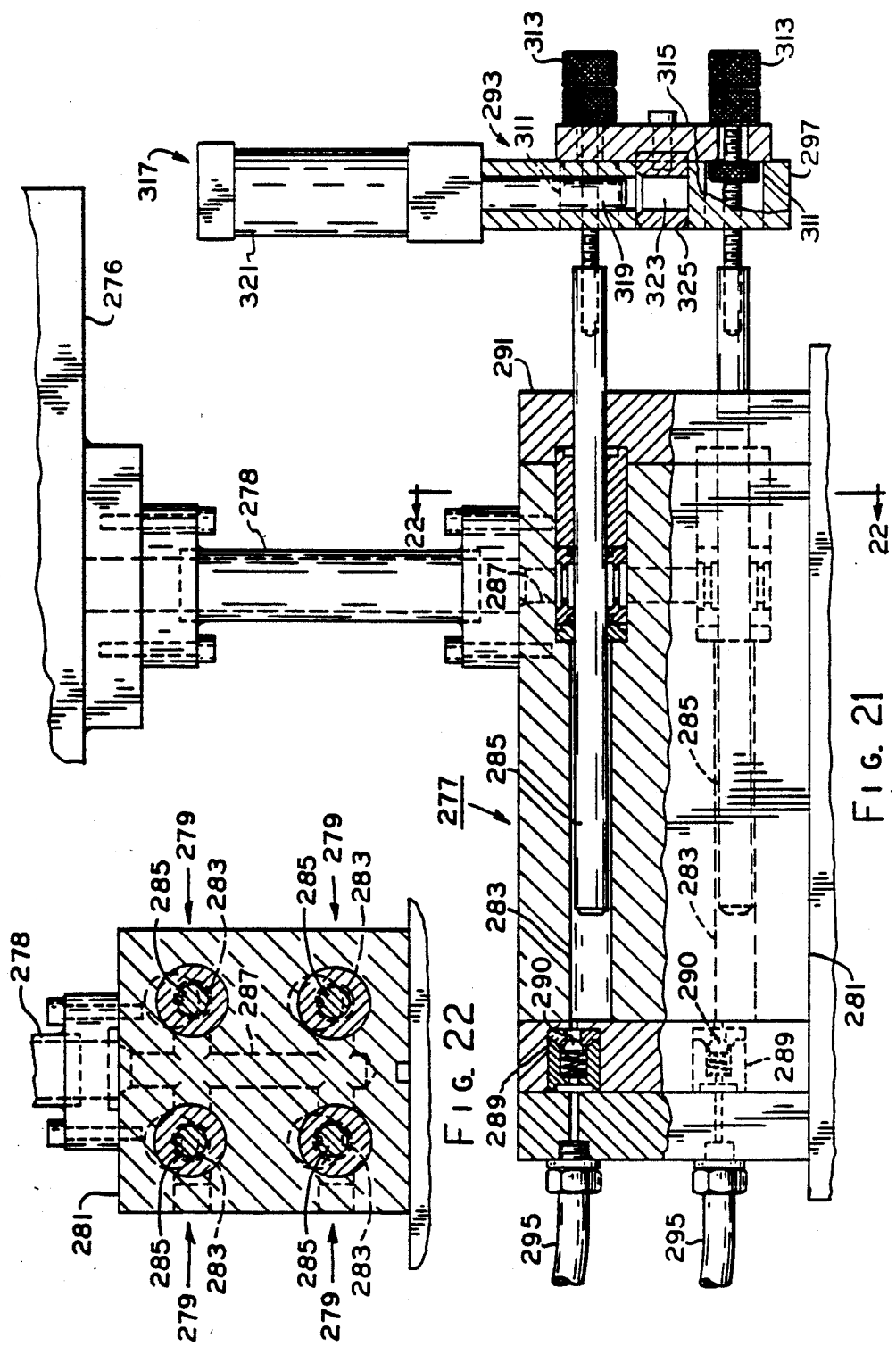

APPARATUS FOR TREATING CORES

CROSS-REFERENCE TO RELATED PATENTS AND APPLICATIONS

This application is a division of the commonly assigned now copending application Ser. No. 743,382 filed Jun. 10, 1985 and is related to the following commonly assigned applications Ser. No. 563,765 filed Dec. 21, 1983 (now U.S. Pat. No. 4,485,126 issued Nov. 27, 1984), Ser. No. 563,766 filed Dec. 21, 1983 (now U.S. Pat. No. 4,559,698 issued Dec. 24, 1985) and Ser. No. 627,824 filed Jul. 5, 1984 (now U.S. Pat. No. 4,574,460 issued Mar. 11, 1986); and a division of Ser. No. 06/743,382, filed Jun. 10, 1985 ; and each of the aforementioned commonly assigned applications is incorporated herein by reference.

FIELD OF THE INVENTION

This invention relates in general to cores adapted for use in a dynamoelectric machine and in particular to apparatus for treating the cores.

BACKGROUND OF THE INVENTION

In the past, various apparatus and methods were employed to treat dynamoelectric machine cores, such as a stator or the like for instance, and the windings thereof with a hardenable liquid adhesive material in order to obtain a strong and more uniform bond of either the windings of such cores or both such cores and the windings thereof.

In one of the past methods of treating the winding means associated with the above discussed past stator when the laminations thereof were fixedly interconnected together, such as by welding or cleating for instance as previously mentioned, the stator and winding means were baked or preheated to a preselected temperature sufficient to at least preanneal the winding means, and while at such an elevated temperature, the stator core and winding means were fully submersed or dipped into a bath of the liquid adhesive material. When later removed from the liquid adhesive material bath, the stator and winding means were transferred to a curing oven to be rebaked or reheated to effect the curing of the liquid adhesive material which had adhered to the stator core and winding means. In some instances, the stator and winding means may have been further redipped and rebaked. Of course, while the cured liquid adhesive material on the opposite end turn portions of the coils may have added some degree of rigidity thereto, it is believed that one of the disadvantageous or undesirable features of such past treatment method was that the stator slots may not have been adequately filled with the liquid adhesive material during the dipping of the stator so that the opposite side turn portions of the coils within the stator slots may not have been adequately saturated or encapsulated by the liquid adhesive material when cured. As a result, it is believed that the strength of the winding means in the stator may have been impaired and also that the opposite side turn portions of the coils may not have been rigidly contained within the stator slots. Further, it is also believed that another disadvantageous or undesirable feature of the past treatment method may have involved the loss, such as by dripping or the like for instance, of liquid adhesive material from the winding means during the transfer of the stator and winding means from the liquid adhesive material bath to a curing oven for baking, and it is also believed that such loss of liquid adhesive material may have created voids between the interstices of at least the opposite end turn portions of the coils serving to weaken them. Thus, it is also believed that when the winding means were energized in a dynamoelectric machine, the opposite end turn portions and opposite side turn portions of the coils may have been movable in response to such energization to an extent wherein the insulation thereon was worn or rubbed away causing short circuits in such winding means. Still another disadvantageous or undesirable feature of the past treatment method is believed to be that it may have been necessary to wipe excess liquid adhesive material from the opposite end faces and the peripheral or circumferential surface therebetween of the stator core prior to baking the stator and winding means to cure the liquid adhesive material therein. A still further disadvantageous or undesirable feature of the past treatment method is believed to be that the insulating sleeves on the lead ends of the winding means may have had to be protected against contact with the liquid adhesive material in the bath thereof during the dipping of the stator and winding means. Still another disadvantageous or undesirable feature of the past treatment method is believed to be that there may not have been sufficient distribution of the liquid adhesive material throughout the winding means and also between the interfaces of the laminations of the core, as well as an evenness of such distribution, so as to deleteriously affect the strength of the core upon the bonding thereof.

In another of the past methods of treating the winding means of the above discussed past stator when the laminations thereof were bonded together by a bolt-down bonding process, as previously mentioned and as taught for instance in U.S. Pat. Re. No. 26,788 issued Feb. 10, 1970 to Bobbie B. Hull which is incorporated herein by reference, only the opposite end turns of the coils were dipped in the bath of the liquid adhesive material prior to baking to effect the cure of the liquid adhesive material. Although this past method of treating the winding means of such past bolt-down bonded stator undoubtedly had many salient features, it is believed that such past method may have had at least some of the same disadvantageous or undesirable features as the previously discussed past treating method.

Another typical past stator of the loose wound type was formed with loosely stacked laminations having the stator slots thereof maintained generally in alignment by the slot liners disposed in the stator slots, and the winding means were associated with this loose lamination stack generally in the same manner as discussed hereinabove. One of the past treating methods for this loose wound stator or core involved mounting an aligning mandrel or the like for instance in the bore of the loose lamination stack, and thereafter baking, fully or completely dipping, and then rebaking the loose wound stator generally in the same manner as discussed hereinabove. Of course, in this instance, it is believed that for the most part, the liquid adhesive material may have flowed by capillary action from the outer circumferential surface of the stator between the interfacing laminations of the loose stack thereof so as to bond the laminations and the winding means together when the loose wound stator was rebaked to effect the curing of the liquid adhesive material; however, it is also believed that some of the liquid adhesive material may have been transferred from the slots of the stator by capillary action between the interfacing laminations of the loose stack thereof. Nevertheless, it is believed that this past method of treating the loose wound stator had at least generally the same disadvantageous or undesirable features as the previously discussed past treating methods.

Still another past method of treating a loose wound stator or core involved the bolt down bonding process as shown in U.S. Pat. No. 3,821,846 issued Jul. 2, 1974 to Bernard J. Pleiss, Jr. In this past method, a plurality of bolts are extended through bolt holes provided therefor in the loose lamination stack of the loose wound stator so as to mount an opposite end face thereof against a bolt-down fixture. Thus, upon torquing of the bolts, the laminations of the loose stack thereof were forced or clamped together by the bolts generally in the vicinity of the bolt hole thereby to establish generally axial compression regions generally adjacent the bolt holes between the opposite end faces of the loose wound stator. When so mounted to the bolt-down fixture, the loose wound stator was preheated and then dipped into the bath of the liquid adhesive material to a depth submersing the lamination stack but not one of the opposite end turn portions of the coils adjacent the lead ends thereof. Thus, the one opposite end turn portions of the coils adjacent the lead ends thereof were not dipped, but liquid adhesive material was later applied thereto. Since the bore of the loose wound stator was mounted on the alignment mandrel, as previously mentioned, it is believed that for the most part liquid adhesive material may have penetrated by capillary action from the outer circumferential surface of the lamination stack between the interfacing laminations thereof so as to cover the interfacing surfaces thereof without regard to the clamping of the bolts or the axial compression regions established thereby; however, it is believed that some of the liquid adhesive material may have been transferred from the slots of the stator by capillary action between the interfacing laminations of the stack thereof. Thereafter, the loose wound core mounted to the bolt-down fixture was transferred to a curing oven to be baked and effect the curing of the liquid adhesive material adhering to the lamination stack and the winding means which, as previously mentioned, served to bond them together. Nevertheless, it is believed that this past method of treating the loose wound core has at least generally the same disadvantageous or undesirable features as the previously discussed past treating methods.

In yet another past method of treating the winding means of the above discussed past stator core in which the laminations were fixedly interconnected together, such as by welding, bonding or cleating for instance, as previously mentioned, the stator core was rotated in only one direction with the bore of the stator extending generally horizontally. During the rotation of the stator in only the one direction, the liquid adhesive material was dripped or trickled onto the opposite end turn portions of the coils of the winding means associated with the stator and flowed therefrom generally along the opposite side turn portions of the coils into the stator slots in which the opposite side turn portions of the coils were received. However, one of the disadvantageous or undesirable features of this past treating method is believed to be that because the stator was rotated in only the one direction, some of the slots of the stator were starved, i.e., not adequately filled, with the liquid adhesive material flowed thereinto. For instance, due to the rotation of the stator in only the one direction, it is believed that a greater amount of the liquid adhesive material dripped onto the opposite end turn portions of the coils flowed therefrom generally along one of the opposite side turn portions of the coils into the stator slots in which the one opposite side turn portions of the coils were received while a lesser amount of the liquid adhesive material flowed generally along the other of the opposite side turn portions of the coils into the slots of the stator in which the other opposite side turn portions of the coils were received thereby, in effect, serving to starve such stator slots in which the other opposite side turn portions of the coils were received of an equal liquid adhesive material fill. In other words, due to the rotation of the stator in only the one direction, it is believed that the dripped liquid adhesive material had a gravitational tendency to flow "downhill" on the opposite end turn portions of the coils, i.e., in the direction of rotation of the stator, and then along the one opposite side turn portions of the coils into the stator slots receiving them, but the liquid adhesive material was at least inhibited with respect to flow "uphill" on the opposite end turn portions of the coils, i.e., against the rotation of the stator in only the one direction; therefore, it is believed that the stator slots in which the other opposite side turn portions of the coils were received were generally starved of the liquid adhesive material, i.e., received the lesser amount of the liquid adhesive material dripped onto the opposite end turn portions of the coils in response to the rotation of the stator in only the one direction.

Of course, it is believed that the methods taught in the disclosures of the aforementioned U.S. Pat. Nos. 4,485,126 and 4,559,698 overcome the above discussed disadvantageous features of some of the past methods of treating cores and winding means thereof which involved inadequate filling of core slots with the liquid adhesive material dispensed onto the windings of such core as well as inadequate bonding of a loose lamination core.

SUMMARY OF THE INVENTION

Among the several objects of the present invention may be noted the provision of improved apparatus for carrying out the inventive subject matter disclosed in the aforementioned U.S. Pat. Nos. 4,485,126 and 4,559,698 as well as overcoming the above discussed disadvantageous or undesirable features of the other prior art discussed hereinabove; the provision of such improved apparatus in which discrete intermittent movements of an endless conveyor means between a plurality of preselected indexed positions defined in a predetermined course thereof are accurately effected and controlled; the provision of such improved apparatus in which the rotational speeds of spindles carried by the endless conveyor means are maintained generally constant upon the advancement of such spindles through some of the preselected indexed positions; the provision of such improved apparatus in which the discrete intermittent movements of the spindles between the some preselected indexed positions is compensated thereby to maintain the rotational speeds of the spindles generally constant; the provision of such improved apparatus in which generally conjoint increases and decreases in the rotational speeds of different ones of the spindles is effected to maintain the generally constant rotational speed; and the provision of such apparatus in which the dispensing of the liquid adhesive material at any one of the some preselected indexed positions is automatically obviated upon the presentation of a spindle without a core disposed thereon at the any one of the some preselected indexed positions. These as well as other objects and advantageous features of the present invention will be in part apparent and in part pointed out hereinafter.

In general, apparatus is provided in one form of the invention to dispense a hardenable liquid adhesive material from a source thereof. The apparatus comprises a plurality of cylinders including a plurality of chamber means for receiving the liquid adhesive material from the source thereof, and a plurality of plunger means are movable in the cylinders and operable generally for displacing liquid adhesive material from the chamber means, respectively. Means is selectively actuated for conjointly moving the plunger means to effect the operations thereof, and the conjointly moving means includes a plurality of latching means associated in releasable engagement with the plunger means and selectively operable in response to the occurrence of a preselected condition for releasing any one of the plunger means associated in the releasable engagement therewith and obviating thereby the operation of the any one plunger means upon the selective actuation of the conjointly moving means, respectively.

Also in general and in one form of the invention, apparatus is provided to treat with a hardenable liquid adhesive material a plurality of cores each having winding means with a pair of opposite end turn groupings thereon. In this apparatus, an endless conveyor means has a predetermined course and is operable generally for discrete intermittent movement between a plurality of preselected indexed positions defined in the predetermined course. At least one set of means is associated with the endless conveyor means and conjointly movable therewith for carrying the cores between the preselected indexed positions, and at least one set of means is arranged generally at some of the preselected indexed positions for dispensing the liquid adhesive material onto at least one of the opposite end turn groupings on the winding means of the cores when the carrying means are in the some preselected indexed positions, respectively. Means is operable generally for intermittent coupling engagement with the endless conveyor means to impart the discrete intermittent movements thereto, respectively.

Further in general, apparatus in one form of the invention is provided to treat with a hardenable liquid adhesive material a plurality of cores each having winding means with a pair of opposite end turn groupings thereon. The apparatus has endless conveyor means operable generally for discrete intermittent movements through a predetermined course therefor with a preselected dwell period between each of the discrete intermittent movements of the endless conveyor means, respectively. At least a set of means is operable generally for driving said endless conveyor means. The driving means includes means associated with each of the driving means and movable for coupling in engagement with confronting parts of the endless conveyor means only during the preselected dwell periods thereof and means selectively operable for intermittently moving the driving means to impart to the endless conveyor means the discrete intermittent movements thereof only when the coupling means are in the engagement thereof with the confronting parts of the endless conveyor means, respectively.

Still further in general and in one form of the invention, apparatus is provided to treat with a hardenable liquid adhesive material a plurality of cores each having winding means with a pair of opposite end turn groupings thereon. The apparatus has endless conveyor means operable generally for discrete intermittent movements between a plurality of preselected indexed positions defined in a predetermined course of the endless conveyor means, and at least one set of means is rotatably arranged on said endless conveyor means and conjointly movable therewith between the preselected indexed positions for carrying the cores, respectively. At least one set of means arranged at some of the preselected indexed positions of the endless conveyor means is operable generally for dispensing the liquid adhesive material onto at least one of the opposite end turn groupings of the winding means of the cores upon the movement of the carrying means into the some preselected indexed positions, respectively. Means is operable generally for preventing the operation of any one of the dispensing means at any one of the some preselected indexed positions in the event that a carrying means without a core thereon is moved into the any one of the some indexed positions.

BRIEF DESCRIPTION OF THE DRAWINGS

FIGS. 1A and 1B, when fitted together on Match Line A, show a side elevational view of apparatus in one form of the invention with means for dispensing a hardenable liquid adhesive material onto cores at a dispensing station of the apparatus broken away for clarity and further illustrate principles which may be employed in practicing a method of operating the apparatus;

FIG. 7 is an enlarged fragmentary view taken from FIG. 1B showing details of the apparatus at the upper rightward end thereof;

FIG. 8 is a sectional view taken along line 8—8 of FIG. 7;

FIG. 11 is a right side elevational view taken from FIG. 5 showing indexing means of the apparatus with the tunnel of the apparatus broken away for clarity;

FIG. 12 is a sectional view taken along line 12—12 of FIG. 11;

FIG. 21 is an enlarged sectional view taken along line 21—21 of FIG. 18;

FIG. 22 is a sectional view taken along line 22—22 of FIG. 21; and

Corresponding reference characters indicate corresponding parts throughout the several views of the drawings.

Figure 2:
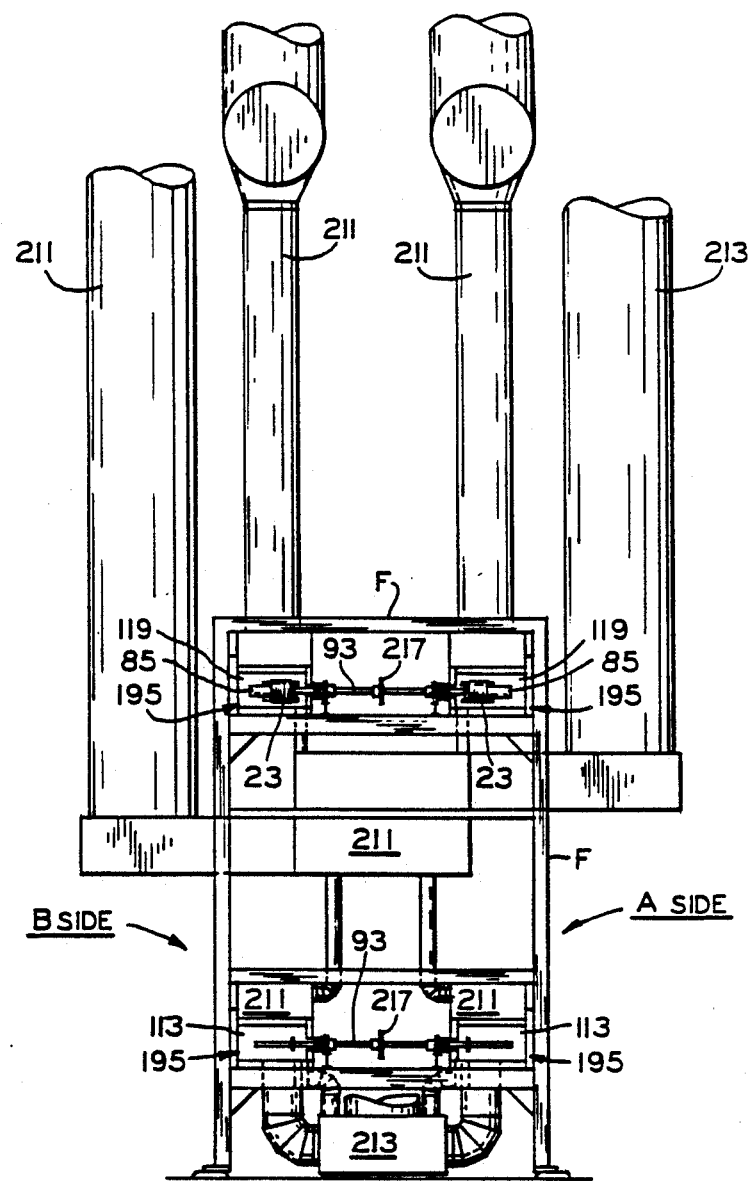
FIG. 2 is a partial sectional view taken along line 2—2 of FIG. 1A.

The exemplifications set out herein illustrate the preferred embodiments of the invention in one form thereof, and such exemplifications are not to be construed as limiting either the scope of the disclosure or that of the invention.

DETAILED DESCRIPTION OF THE PREFERRED EMBODIMENT

The invention is herein described particularly as it relates to the treatment of dynamoelectric machine cores, such as stators or the like for instance, and if a more detailed discussion concerning the construction of such cores or the treatment thereof with a liquid adhesive material is desired, reference may be had to the aforesaid U.S. Pat. Nos. 4,485,126 and 4,559,698. As shown in the aforesaid patents and as illustrated for purposes of disclosure in FIGS. 10 and 15 hereof, a core 23, which may be of the so-called loose wound type, is provided with a plurality of interfacing lamination surfaces interposed between a pair of opposite end faces 27, 29 of the core, a bore 67 extending generally axially through the core and intersecting with the opposite end faces of the core, and a plurality of slot means 31 intersecting with both the bore and the opposite end faces of the core for receiving winding means 21, respectively. Winding means 23 for core 21 includes a plurality of sets of coils 33 formed of a magnet wire having an insulating coating thereon, each coil having at least one conductor turn 35 with opposite side turn portions 37, 39 of the coils received in the slot means of the core and with opposite end turn portions of the coils arranged in generally opposite annular end turn groupings 45, 47 thereof about the bore adjacent the opposite end faces of the core, respectively. While core 23 is illustrated herein for purposes of disclosure, it is understood that the apparatus of the instant invention may be utilized to treat various types of cores (including rotor cores) having different constructions, shapes, stack heights and winding configurations within the scope of the invention so as to meet at least some of the objects thereof.

Referring to FIGS. 1A and 1B, apparatus 69 in one form of the invention is shown to comprise an endless conveyor or conveyor means, designated in its entirety by the reference numeral 71, having a lower generally horizontal reach 73 which travels forwardly from left to right as viewed in FIGS. 1A and 1B, an upwardly movable generally vertical end reach 75 (at the right end of FIG. 1B), an upper generally horizontal return reach 77 which travels back above the lower reach (it travels from right to left as viewed in FIGS. 1A and 1B), and a downwardly movable generally vertical end reach 79 (at the left end of FIG. 1A). For convenience in describing apparatus 69 and as indicated in FIG. 2, that side of apparatus 69 and conveyor means 71 which is at the right as viewed in the direction of downstream movement of the lower reach in FIG. 2 is referred to as the A side and the other side is referred to as the B side. "Downstream" is in reference to the direction of forward movement of conveyor means 71 (i.e., left to right in lower reach 73, up in end reach 75, right to left in upper reach 77, and down in end reach 79, as viewed in FIGS. 1A and 1B). "Upstream" is in reference to the opposite direction.

Figure 10:
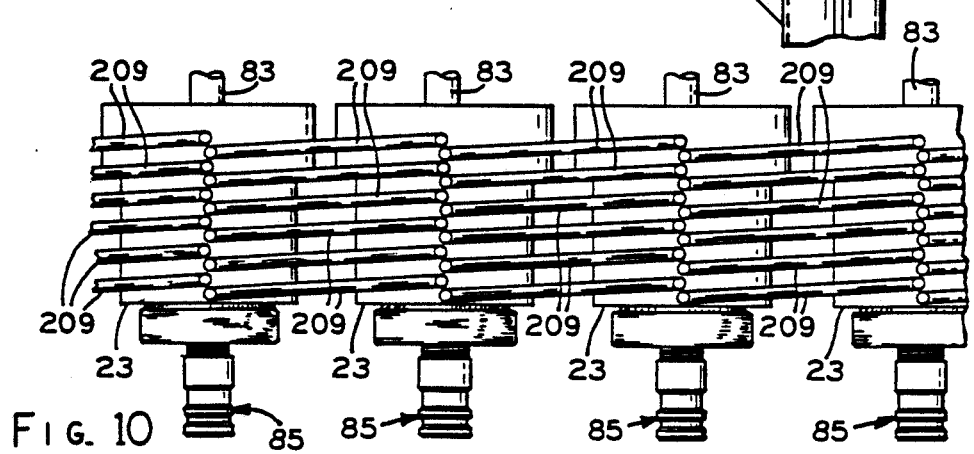
FIG. 10 is a partial section view taken along line 10—10 in FIG. 9 and illustrating the arrangement of a plurality of infrared heating lamps as disposed in an elongate heating chamber or tunnel of the apparatus.
Figure 15:
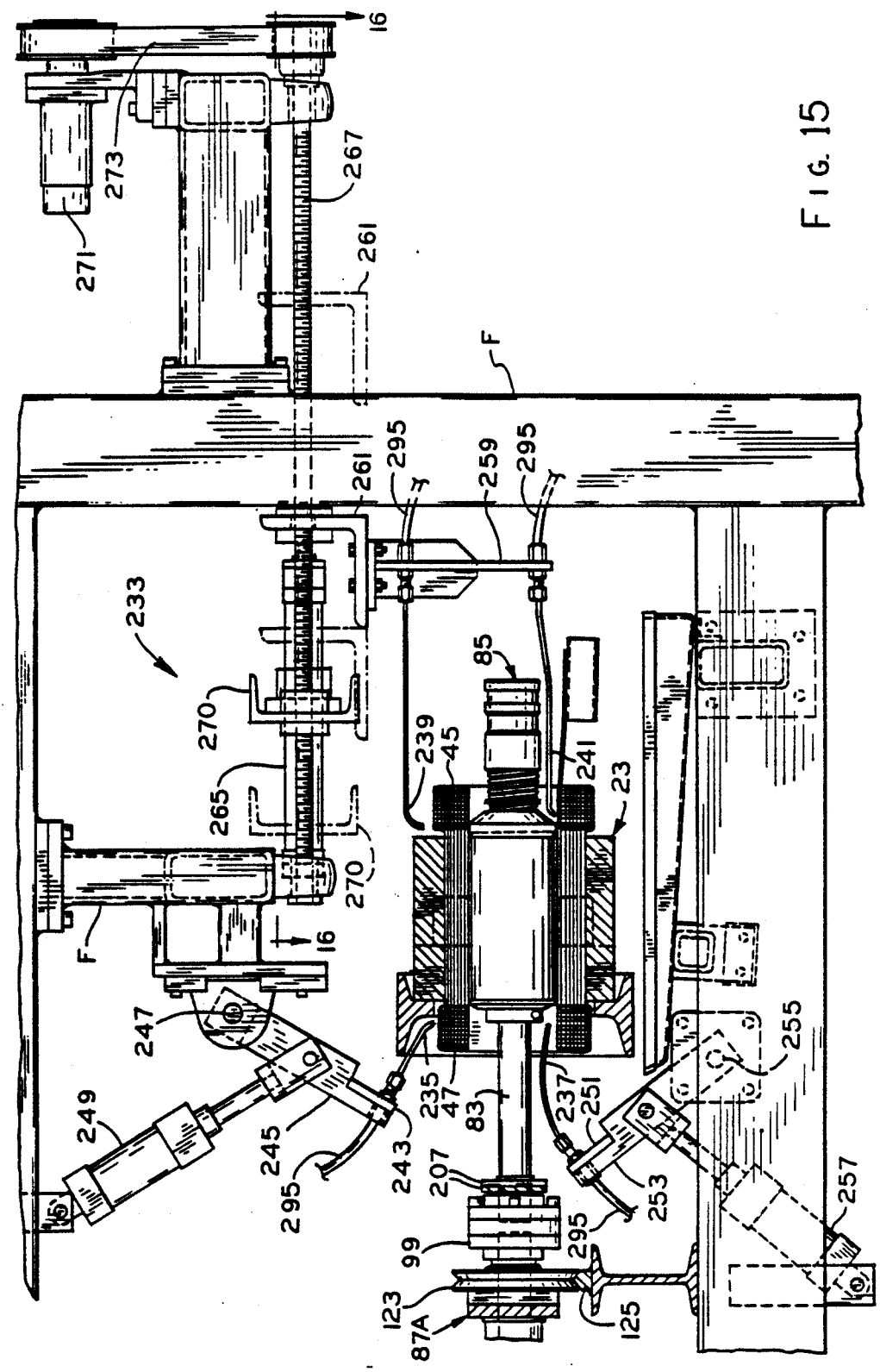
FIG. 15 is a sectional view taken along line 15—15 of FIG. 1B at the dispensing station of the apparatus.
Figure 16:
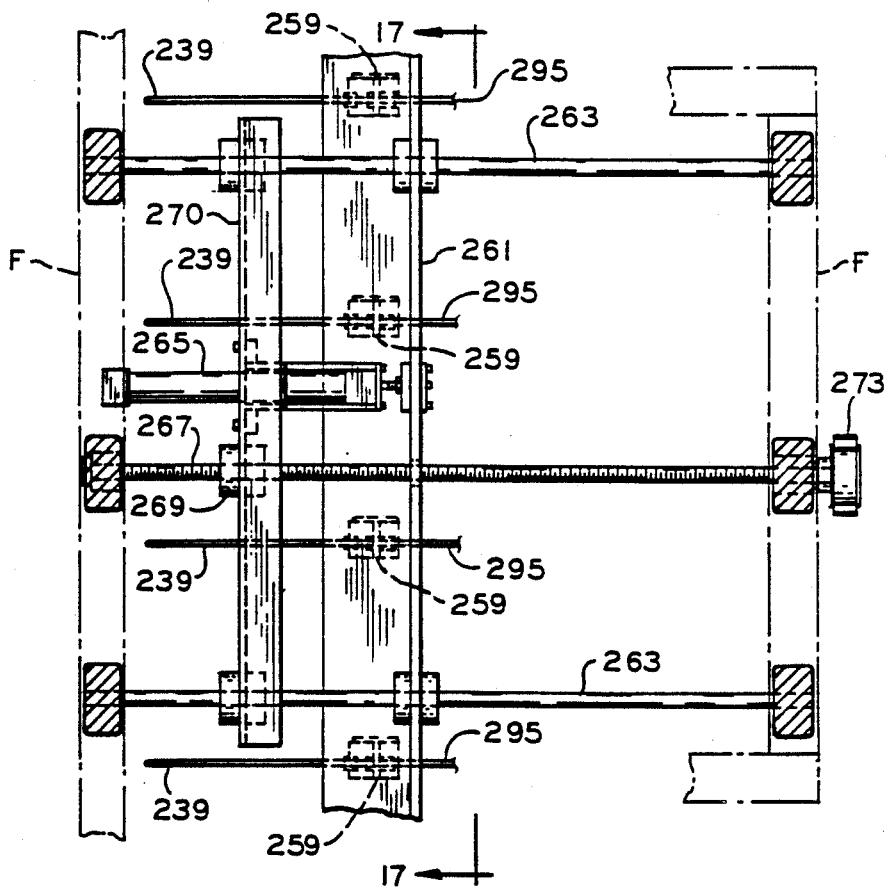
FIG. 16 is a partial sectional view taken along line 16—16 of FIG. 15.

Conveyor means 71 supports or carries a plurality or set 81A of carrying means or spindles 83 spaced at equal intervals thereon extending generally laterally outwardly from the conveyor means at the A side thereof and another plurality or set 81B of such spindles 83 spaced at equal intervals thereon extending laterally outwardly from the conveyor means at the B side thereof. While spindles 83 carried by conveyor means 71 are illustrated for purposes of disclosure as extending generally horizontally therefrom, it is contemplated that such spindles may be slightly angularly disposed with respect to the horizontal, i.e., may be non-vertical within the scope of the invention so as to meet at least some of the objects thereof. Each of spindles 83 of each 81A, 81B sets thereof is rotary on its axis relative to conveyor means 71 and is adapted to have a core 23 detachably mounted (loaded) thereon by any suitable means, such as for instance a chucking means or device indicated at 85, adapted to grip the spindle and and maintain the core in a gripped position thereon. Chucking means 85 is shown in FIGS. 10 and 15, and if a more detailed discussion of the construction and operation of the chucking means is desired, reference may be had to the aforesaid U.S. Pat. No. 4,574,460.

Figure 3:
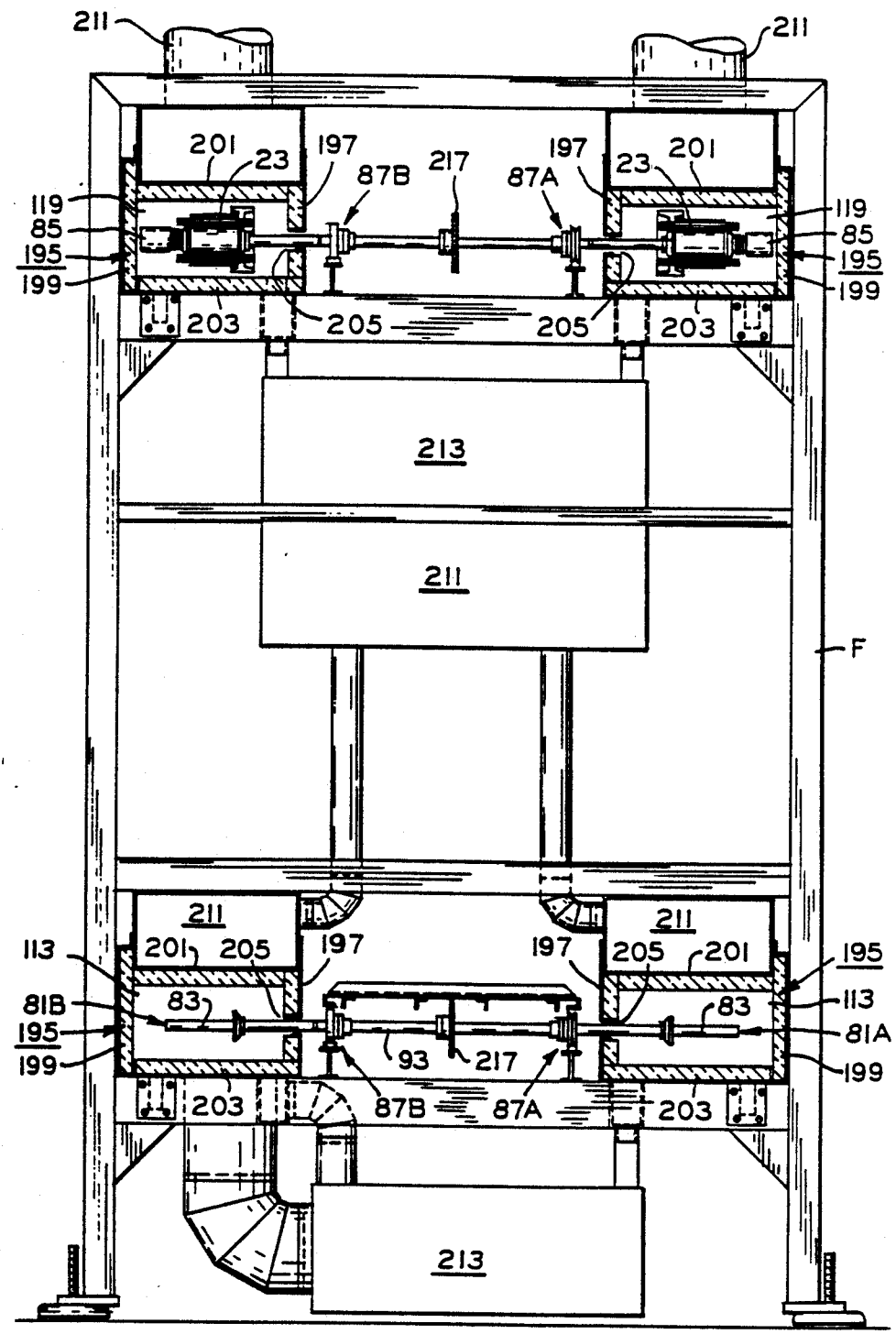
FIG. 3 is an enlarged fragmentary view taken from FIG. 2.
Figure 4:
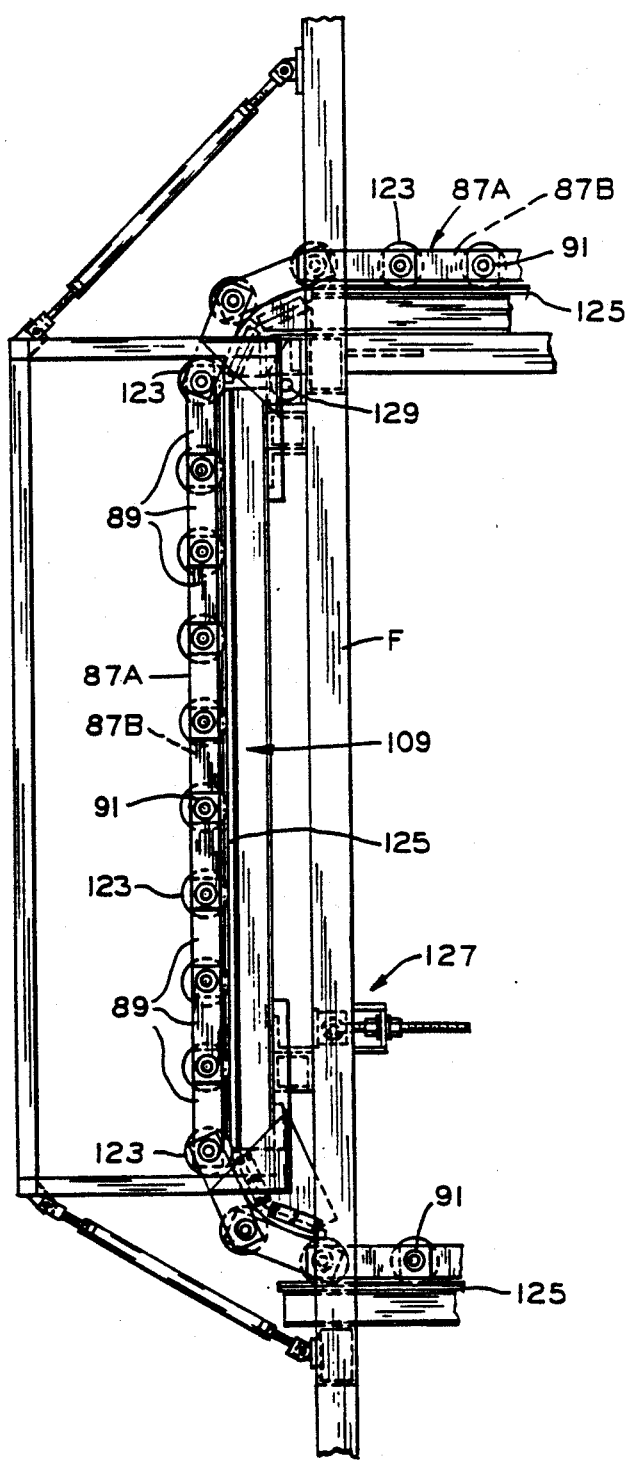
FIG. 4 is an enlarged fragmentary view taken from FIG. 1A showing details of the apparatus at the leftward end thereof.
Figure 5:
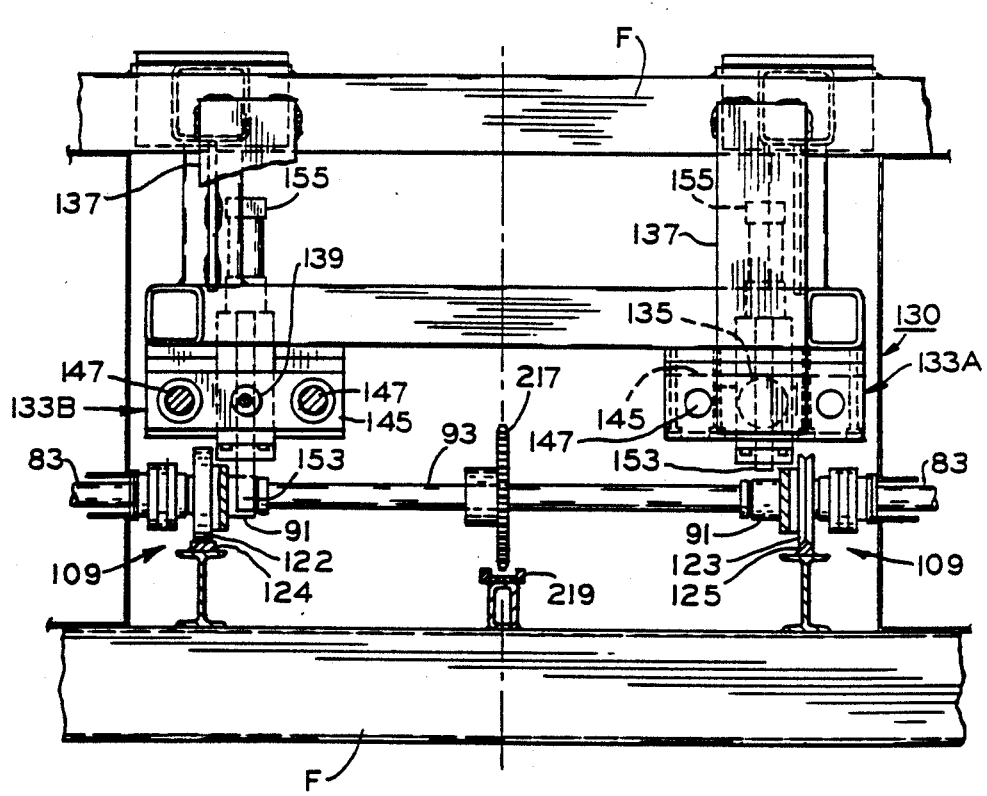
FIG. 5 is an enlarged partial sectional view taken along line 5—5 of FIG. 1B.
Figure 6:
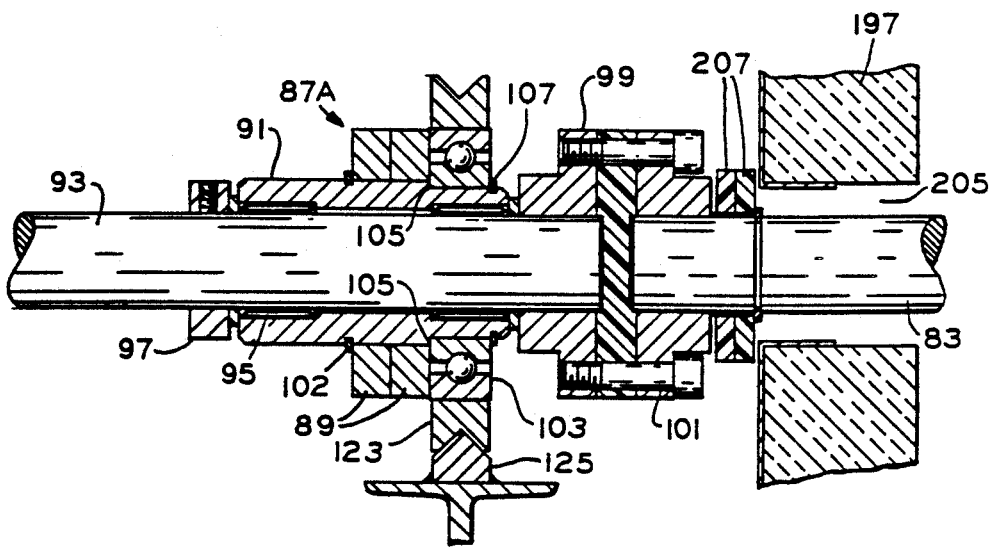
FIG. 6 is an enlarged fragmentary sectional view taken from FIG. 5 and illustrating the coupling of shafts and spindles of the apparatus.

Conveyor means 71 comprises a pair or set of what are essentially endless chains, a chain 87A at the A side of apparatus 69 and a chain 87B at the B side thereof, as indicated in FIG. 3. Each of chains 87A, 87B comprises a set or plurality of links each designated 89, as may be seen in FIG. 4, with successive links being pin-connected at their adjacent opposite ends by suitable means, such as for instance a plurality of tubular pins 91 or the like, and the details of this tubular pin connection are shown in FIG. 6. A set or plurality of shafts 93 are journalled by suitable means, such as for instance a plurality of bearings or the like indicated at 95, associated with tubular pins 91, and the shafts extend through the pins of chain 87A, as illustrated in FIG. 5, across conveyor means 71 and through pins 91 of chain 87B. Tubular pins 91 of each chain 87A, 87B are respectively retained between a collar 97 on shaft 93 at the inner end of the pin and a combination collar and spindle coupling member 99 at the outer end of the shaft. Spindles 83 are secured to coupling members 99 at opposite ends of shafts 93 in axial alignment with the shafts, as indicated at 101, so that the spindles are conjointly rotatable with the shafts, and the spindles extend generally axially outwardly from the shafts outside links 89 of chains 87A, 87B, respectively.

As shown in FIGS. 1A and 1B, there are two hundred eighty-four shafts 93, and thus two hundred eighty-four spindles 83 on the A side of conveyor means 71 and two hundred eighty-four spindles 83 on the B side of the conveyor means. Referring again to FIG. 6, shafts 93 interconnect chains 87A, 87B and extend generally at right angles to the planes or reaches of the two chains. The adjacent opposite ends of links 89 on each pin 91 are held against axial movement relative to the pin between a retainer 102 on the pin and a ball bearing 103, the inner race of which is held against a shoulder 105 on each pin by another retainer 107 secured to each pin, respectively. With this arrangement, chains 87A, 87B are held generally in parallel spaced apart relation. By way of example, the distance between the chain link pin centers and hence the spacing of the spindles 83 may be nine inches, which is sufficient to allow for the mounting or loading onto the spindles of the cores to be processed or treated. While the numbers of shafts 93 and spindles 83 secured thereto as well as the spacing of the spindles are stated hereinabove for purposes of disclosure, it is contemplated that different numbers of such shafts and spindles and different spacings thereof may be utilized within the scope of the invention so as to meet at least some of the objects thereof.

Means, as indicated generally at 109 in FIG. 5, is provided for guiding the travel of conveyor means 71 to carry spindles 83 in an endless path or course in a generally vertical or non-horizontal plane at the A side and the B side of the conveyor means, with these spindles extending generally outwardly at that side, respectively. As best seen in FIGS. 1A and 1B, conveyor means 71 carries sets 81A, 81B of spindles 83 for travel in their respective endless path or course defined by that of the conveyor means from a first zone constituting a loading zone 111 at the respective sides of the conveyor means where cores may be loaded (chucked) on the spindles, through a second zone 113 at the respective sides of the conveyor means wherein the cores and winding means are preheated before application of the liquid adhesive material, thence through a third zone constituting an adhesive applying or dispensing zone 115 at the respective sides of the conveyor means for application of the liquid adhesive material to the winding means of the cores, thence through a fourth zone 117 at the respective sides of the conveyor means wherein the cores are heated or reheated for effecting gelling and solidification or hardening of the applied liquid adhesive material, thence through a fifth zone constituting a cooling zone 119 at the respective sides of the conveyor means for cooling each core and its winding means, thence to a sixth zone constituting an unloading zone 121 at the respective sides of the conveying means where the cooled cores are taken off the spindles, and thence returning to the loading zone 111 at the respective sides of the conveyor means, for repeating the operation.

Unloading and loading zones or sections 121, 111, preheating zone or section 113, adhesive applying zone or section 115, and an initial part of reheating zone or section 117 for each set of spindles 83 are in series along lower reach 73 of conveyor means 71. Reheating zone or section 117 for each set of spindles 83 starts toward the downstream end of lower reach 73, extends upwardly along end reach 75 and then back for some distance along upper reach 77. Cooling zone or section 119 for each set of spindles 83 starts in upper reach 77 toward its downstream end and extends downwardly along end reach 79 thereby to terminate at and join with unloading zone 121.

Guide or guiding means 109 for conveyor means 71 comprises a pair of rollers or rolling means 122, 123 mounted about the outer races of ball bearings 103 on pins 91, and the rollers are rotatable in rolling and guided engagement on rails or tracks 124, 125 which predetermines the aforesaid course of the conveyor means and spindles 83. It may be noted that the outer circumferential surface of roller 122 is generally cylindric while that of roller 123 is grooved and that the cross-sectional configuration of rails 124, 125 mate with the aforementioned configurations of rollers 122, 123, respectively. In this manner, grooved roller 123 is guidably received on its mating rail 125 thereby to accurately maintain dimensions and locations of spindles 83 and shafts 93 with respect to the A side and B side of conveyor means 71. Rails 124, 125 are provided for lower reach 73, upper reach 77 and end reaches 75, 79 of conveyor means 71, and suitable means, such as indicated at 127 in FIG. 4, including pivot means 129 may be provided for pivotally adjusting the rails at end reach 79 for chain tensioning purposes, as discussed in detail hereinafter.

Unloading zone 121 for each set of spindles 83 is an open zone extending over a relatively short distance downstream from the upstream end of lower reach 73 of conveyor means 71. As indicated in FIG. 1A, unloading zone 121 extends for a distance such as to include five spindles. Loading zone 111 for each set of spindles 83 is immediately downstream from unloading zone 121 in lower reach 73 and extends for a distance encompassing the next five spindles. Preheating zone 113 for each set of spindles 83 is an enclosed zone along lower reach 73 extending from loading zone 111 for a major portion of the lower reach, for instance, a distance encompassing one hundred spindles. Application zone 115 for each set of spindles 83 is an open zone immediately downstream from preheating zone 113 in lower reach 73, and the application zone extends a distance encompassing eight spindles. Reheating zone 117 is mostly an enclosed zone starting in lower reach 73 immediately downstream from application zone 115 and including end reach 75 and a major portion of upper reach 77. Cooling zone 119 extends from the downstream end of reheating zone 117 generally to unloading zone 121. While conveyor means 71 is described hereinabove as having particular zones 111-121 each having a particular length or extent along reaches 73-79 of the conveyor means for purposes of disclosure, it is contemplated that different types of zones as well as a different number of zones in different sequences and of different lengths or extents may be employed within the scope of the invention so as to meet at least some of the objects thereof.

A pair or set of means, as indicated generally at 130, 131 in FIG. 1A, are selectively operable generally concurrently for intermittently or progressively driving or indexing conveyor means 71 to advance or index spindles 83 forwardly on each indexing step or operation of the indexing or driving means a preselected index distance which is a whole multiple of the spindle spacing with the spindles dwelling in indexed positions thereof for a preselected time interval or period between such indexing steps. Thus, conveyor means 71 and spindles 83 are driven with preselected intermittent movements through a plurality of preselected indexed positions in the predetermined course of the conveyor means. In apparatus 69, the index distance which spindles 83 are moved is twice the spindle spacing; however, in referring to the index distance being a whole multiple of the spindle spacing, it is intended to cover the situation where the index distance is equal to the spindle spacing. It is, of course, understood that the aforesaid preselected index distance of the conveyor means and spindles is set out herein for purposes of disclosure and that various other such preselected index distances may be employed, as desired, within the scope of the invention so as to meet at least some of the objects thereof. Further, while a pair of indexing means 130, 131 each having a pair of drive units 133A, 133B are illustrated herein for purposes of disclosure, it is contemplated that more or less of such indexing means may be utilized and that indexing means other than those disclosed herein may be utilized within the scope of the invention so as to meet at least some of the objects thereof. Indexing means 130, 131 each comprise a plurality or set of coupling or drive units 133A and 133B on the A and B sides of conveyor means 71, respectively, as illustrated in FIG. 5. Indexing means 130 is located at the downstream end of preheating zone 113 along lower reach 73 of conveyor means 71 for driving the lower reach forwardly (i.e., from left to right as viewed in FIGS. 1A and 1B) through the stated index distances, and indexing means 131 is located toward the downstream end of upper reach 77 of the conveyor means for driving the upper reach forwardly (i.e., from right to left as viewed in FIGS. 1A and 1B) through the stated index distances. Since drive units 133A, 133B of indexing means 130, 131 are identical, only the drive unit 133A of indexing means 130 is described hereinafter and shown in FIGS. 11 and 12 for purposes of brevity of disclosure and drawing simplicity. Drive unit 133A comprises a hydraulic cylinder 135 having a stroke which equals the index distance or travel (e.g., eighteen inches) of indexing means 130, 131, as previously mentioned, and the hydraulic cylinder is fixed at 137 to frame F of apparatus 69 in a position extending in the direction of movement of the respective one of lower and upper reaches 73, 77 of conveyor means 71 with which the drive unit is associated. A piston rod 139 extends from a piston 141 in cylinder 135 (see FIG. 23C) through the downstream rod end of the cylinder and is coupled at 143 to a carriage 145 slidable on a pair of guide rods 147 carried by frame F of apparatus 69. Carried by carriage 145 is a slide guide 149 in which is slidable a coupler or coupling means 151 having a forked lower end 153 for coupling in engagement, on movement of the coupler from a raised at-rest or retracted position to a lowered coupling or protracted position, with a tubular pin 91 of the respective chain of conveyor 71. A cylinder 155 for actuating coupler 151 is mounted on carriage 145, this cylinder having its piston rod 157 extending from its piston 159 (see FIG. 23C) to a connection with the coupler. The arrangement is such that when piston rod 139 of carriage cylinder 135 is retracted, carriage 145 occupies a retracted position wherein coupler 151 is above a pin 91 when conveyor means 71 and spindles 83 are in a preselected indexed position thereof. When coupler 151 is moved by means of coupler cylinder 155, carriage 145 is coupled to that pin 91, and then upon the extension of piston rod 139 from carriage cylinder 135 for its full stroke, pin 91 is driven forwardly or advanced to effect the indexing of conveyor means 71 and spindles 83 through the stated index distance into the next successive preselected indexed position thereof. Carriage 145 is shown in its retracted position with coupler 151 in engagement with pin 91 in full lines in FIGS. 11 and 12, and in its extended position (also with the coupler engaged with the pin) in phantom in FIGS. 11 and 12. Having indexed conveyor means 71 and spindles 83 forwardly one indexing step through the preselected indexed positions a described above, cylinder 155 is actuated to disengage coupler 151 from pin 91 with which it was in engagement, piston rod 139 of cylinder 135 is retracted thereby to retract carriage 145, and then coupler 151 is again moved into engagement with the next pin 91 of the respective chain of conveyor means 71. A first bridge 161 across guide rods 147 carries an adjustable stop 163 for carriage 145 determining its advanced or extended position. A second carriage 165 downstream from bridge 161 carries a slide guide 167 in which is movable a chain lock or locking means 169 having a forked lower end for coupling or locking in engagement with a pin 91 on downward movement of the chain lock from a raised at-rest or retracted position by a hydraulic cylinder 171 mounted on the slide guide when conveyor means 71 and spindles 83 are in a preselected indexed position. A piston rod 173 of cylinder 171 extends downwardly from its piston 175 (see FIG. 23C) to a connection with the upper end of chain lock 169. Thus, indexing means 130 is operable to effect the preselected intermittent movements of conveyor means 71 and spindles 83 through the preselected indexed positions thereof only when coupler 151 of drive unit 133A is coupled with a confronting one of pin 91, and both the coupler and chain lock 169 are coupled with confronting ones of the pins to accurately maintain the conveyor means and spindles located in the preselected indexed positions thereof, respectively, with at least the chain lock obviating movement of chain 87A.

Adjacent the downstream end of upper reach 77 of conveyor means 71 there is provided means, as indicated generally at 175 in FIGS. 7 and 8, for preventing retrograde movement of the conveyor means. This comprises a pair of latches or holding pawls 177, 179 at each A and B side of the conveyor means. Each latch 177 is pivoted, as indicated at 181, on frame F of apparatus 69 for pivotal swinging movement on a transverse axis below chains 87A, 87B, and this latch extends in upstream direction from pivot 181 being biased by resilient means, such as a coil compression spring 183 or the like for instance, toward engagement with tubular pins 91 of the respective chain. At its upstream end, latch 177 has an upwardly extending latch finger 185 with a curved downstream edge engageable by a pin 91 of the respective chain and an inclined camming edge 187 at its upstream end. The arrangement is such that as the chain is advanced or indexed forwardly (which is toward the left as viewed in FIG. 7), a pin 91 of the chain will engage the camming edge 187 of latch 177 and swing the latch about its pivot 181 to allow for the aforementioned indexing of the chain. Each of the other latches 179 is pivoted as indicated at 189 on frame F above upper reach 77 of conveyor means 71 and gravity-biased for the engagement of its lower end 191 with shafts 93, and latches 179 have a finger 193 extending in downstream direction adapted to bear on top of a shaft.

Figure 9:
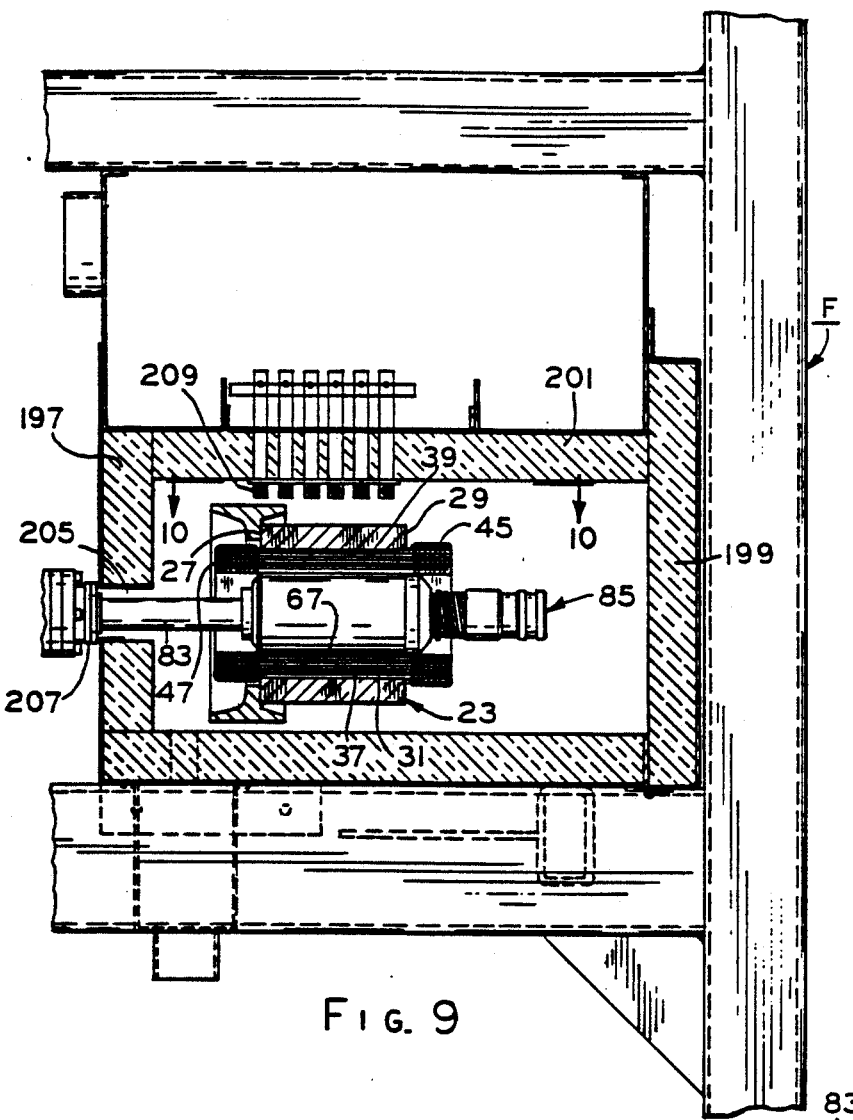
FIG. 9 is an enlarged partial sectional view taken along line 9—9 in FIG. 1A.

Referring to FIG. 1, it will be observed that with conveyor means 71 and spindles 83 at rest in a preselected indexed position thereof during a dwell period of the conveyor means, the spindles of the 81A, 81B sets thereof are situated at two hundred and forty-eight spindle stations or preselected indexed positions spaced at equal intervals all around the endless predetermined course of the conveyor means in which the spindles move. These preselected indexed positions of spindles 83 may be referred to as stations S1–S248, starting with the first spindle in lower reach 73 of conveyor means 71. Spindles 83 at stations S1–S4 are in unloading zone 121, and those at stations S5–S8 are in loading zone 111. Each preheating zone 113 starts between stations S10 and S11 and extends to a point between stations S110 and S111. As above noted and as may be seen in FIGS. 3 and 10, each preheating zone 113 is an enclosed zone comprising an elongate chamber or tunnel 195 of rectangular cross section having inside and outside walls 197, 199 with a top wall 201 and a bottom wall 203 interposed therebetween. Each chamber or tunnel 195 extends alongside or about the respective chains 87A, 87B on the outside thereof. Inside wall 197 of tunnel 195 has a spindle receiving slot 205 extending from end-to-end thereof generally at the level of the spindles along lower reach 73 of the respective chains. Spindles 83 in lower reach 73 throughout the length of the first heating tunnel 195, i.e., from station S11 to station S110, extend laterally outwardly from the respective chain into the tunnel, and the opposite ends of the tunnel are open for entry of the spindles with cores thereon from station S10 into the tunnel and exit of the spindles with the cores thereon from the tunnel at station S110 into adhesive application zone 115. As illustrated in FIGS. 6 and 10, a plurality of strips 207 of suitable heat insulation material, for instance, such as that sold under the General Electric Company trademark TEXTOLITE ®, are carried between adjacent ones of spindles 83 in the 81A, 81B sets thereof in conveyor means 71 and such strips closely extend or are provided along slot 205 in the inside wall 197 of tunnel 195 exteriorly thereof not only to reduce emission of heat from the tunnel through the slot but also to protect bearings 95 and 103 from such heat. As seen in FIG. 9, heating means, such as a plurality of infrared lamps 209 or the like for instance, is provided along the length of tunnel 195 for heating cores 23 on spindles 83 as they dwell in the tunnel at stations S11–S60 and as they are indexed through the tunnel. The arrangement is preferably such that as cores 23 on spindles 83 progress from station S11 to station S60, they are brought up to a preselected temperature within a preselected temperature range for driving off volatiles from winding means 21 of the cores and for craze and stress relief of the magnet wire of the winding means; however, while the cores are held generally at that preselected preheat temperature from station S61 to station S90, they may be allowed to cool down somewhat within the preselected preheat temperature range from station S91 to station S110. For the latter purpose, tunnel 195 may be slotted as indicated at 210 in FIG. 1B for delivery of cooling air thereto.

There are ten stations, identified as stations S111–S120 in adhesive application zone 115, of which S112–S119 (eight stations) are adhesive application stations. As will appear, spindles 83 at the first four application stations S112–S115, which may be referred to as the upstream set of application stations, rotate in one direction (specifically counterclockwise as viewed in FIG. 1B), and the spindles at the next four stations S116–S119, which may be referred to as the downstream set of application stations, rotate in the reverse direction (specifically clockwise as viewed in FIG. 1B). While spindles 83 are identified as being rotatable in clockwise and counterclockwise directions at specific stations for purposes of disclosure, it is contemplated that such spindles may be rotated in either such direction at any one of such stations or at more or less of such stations within the scope of the invention so as to meet at least some of the objects thereof.

Spindles 83 at each side of conveyor means 71 exit from the respective adhesive application zone 115 and enter the respective reheating zone 117. Of course, reheating zone 117 is also enclosed by an elongate chamber or tunnel corresponding to tunnel 195, and parts of each of the tunnels in the reheating zone corresponding to parts of the tunnel 195 are assigned corresponding reference numerals. Reheating zone 117 starts between stations S120 and S121 and extends to a point between stations S242 and S243. Cooling zone 119 is further enclosed by an elongate chamber or tunnel corresponding generally to tunnel 195, and parts of the cooling tunnel corresponding to parts of the tunnel 195 are assigned corresponding reference numerals. As cores 23 on spindles 83 progress from station S121 to station S242 through reheating zone 117, they are brought up to a preselected reheating temperature within the aforementioned preselected reheating range so as to effect the gelling and/or curing or hardening of the liquid adhesive material contained in cores 23 and winding means 21 thereof, and it may be noted that the preselected reheat temperature in one portion of the reheating zone may be different than that in another portion thereof within the preselected reheating temperature range. Cooling zone 119 starts at a point between stations S242 and S243 and extends through station S284. The aforementioned cooling tunnel may be slotted as indicated at 210 for entry of cooling air. Ductwork for cooling air provided to the cooling tunnel and preheating tunnel is indicated at 211, and an exhaust system for the reheating tunnel is indicated at 213.

Figure 13:
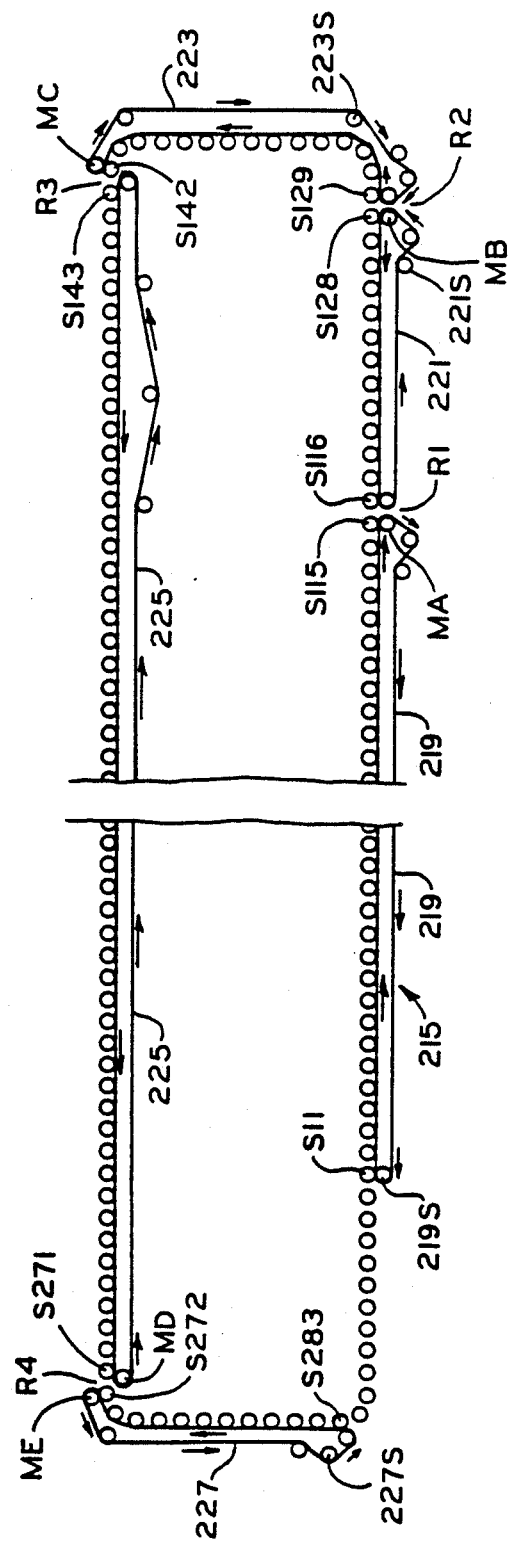
FIG. 13 is a schematic view showing a system of chain drives utilized to effect preselected rotational movements of the shafts and spindles of the apparatus.
Figure 14:
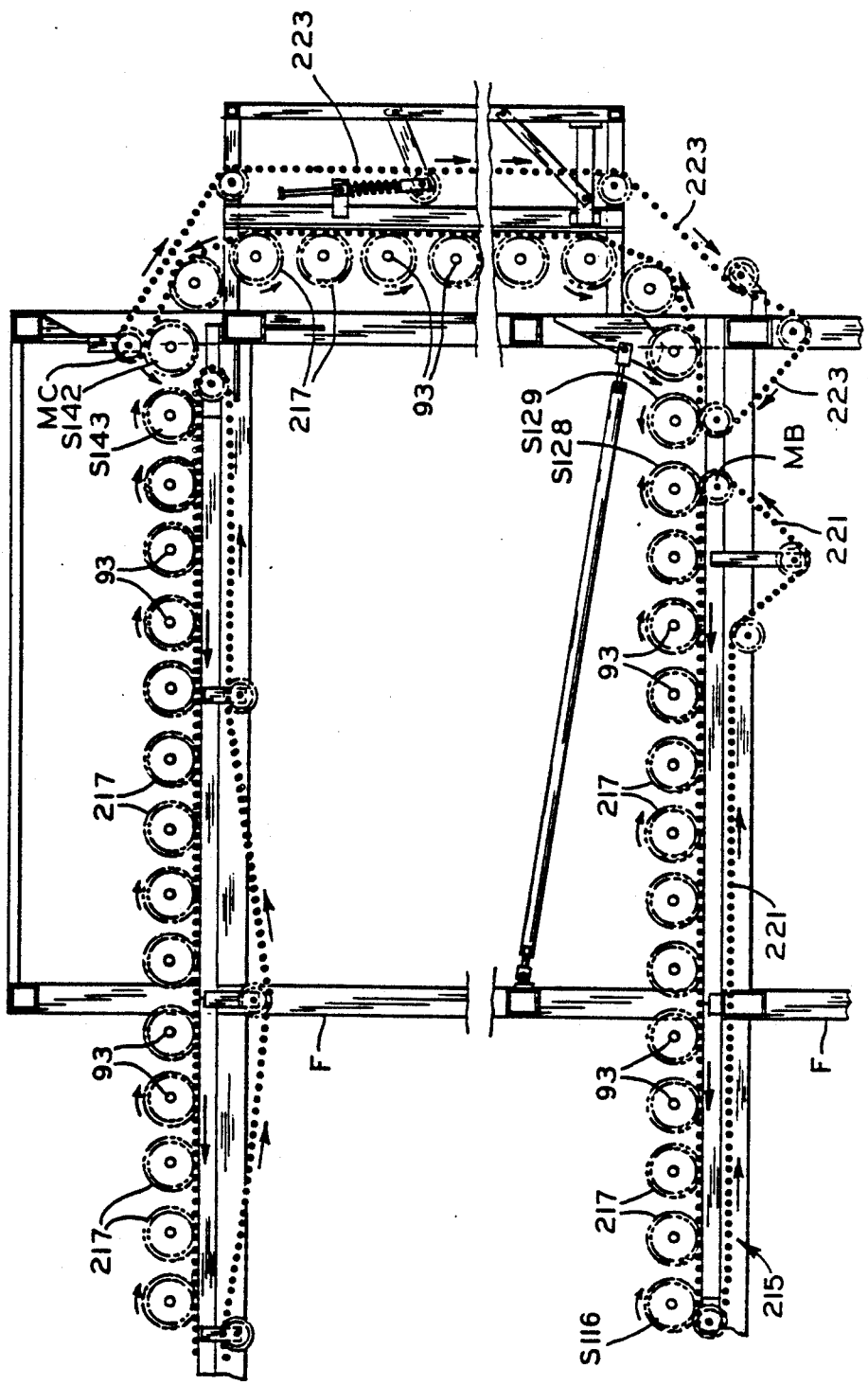
FIG. 14 is an enlarged side elevational view taken from FIG. 1B with part of the apparatus broken away to illustrate the driving association of some of the chain drives of FIG. 13 with sprockets provided therefor on the shafts of the apparatus.

Means, as indicated generally at 215 in FIGS. 13 and 14, is provided for rotating spindles 83 in each preheating zone 113, adhesive application zone 115, reheating zone 117 and cooling zone 119, with reversals of direction of spindle rotation at certain points, more particularly at point R1 between stations S115 and S116 in each adhesive application zone 115, at point R2 between stations S128 and S129 in reheating zone 117, at point R3 between stations S143 and S144 in reheating zone 117, and at point R4 between station S271 and S272 in the cooling zone. It may also be considered that there is a reversal between stations S247 and S11. As herein illustrated, rotating means 215 is operable:

(a) continuously to drive all spindles 83 at stations S11 to S115 in counterclockwise direction as viewed in FIGS. 1A, 1B and from the right side of the apparatus, and also to drive them in this direction as they are indexed from station S11 to station S115;

(b) continuously to drive all the spindles at stations S116 to S128 in clockwise direction as viewed in FIG. 1B and from the right side of the apparatus, and also to drive them in this direction as they are indexed from station S116 to station S128;

(c) continuously to drive all the spindles at stations S129 to S142 in counterclockwise direction as viewed in FIG. 1B, from the right side of the apparatus, and also to drive them in this direction as they are indexed from station S129 to station S142;

(d) continuously to drive all the spindles at stations S143 to S271 in clockwise direction as viewed in FIGS. 1A, 1B from the right side of the apparatus, and also to drive them in this direction as they are indexed from station S143 to station S271; and (e) continuously to drive all the spindles at stations S272 to S283 in clockwise direction as viewed in FIG. 1A from the right side of the apparatus, and also to drive them in this direction as they are indexed from station S272 to S283.

There is no drive for spindles 83 at stations S284 and S1 to S10, and they idle at these stations to facilitate the unloading and loading of cores 23 from the spindles in loading and unloading zones 111, 121.

For effecting the rotation of spindles 83, each shaft 93 has a sprocket 217 mounted or fastened to it at the center of its length midway between the rollers 122, 123 (see FIGS. 2, 3 and 5). Spindle drive or rotation means 215 comprises a first drive chain 219 engaging sprockets 217 of shafts 95 at stations S11 to S115 for driving them in counterclockwise direction, a second drive chain 221 engaging the sprockets of the shafts at stations S116 to S128 for driving them in clockwise direction, a third drive chain 223 engaging the sprockets of the shafts at stations S129 t S143 for driving them in counterclockwise direction, a fourth drive chain 225 engaging the sprockets of the shafts at stations S144 to S271 for driving them in clockwise direction as above noted, and a fifth drive chain 227 engaging the sprockets at stations S272 to S283 for driving them in counter-clockwise direction. Each spindle chain 219-227 is trained around suitable guide sprockets therefor such as indicated at 299, and each such chain is driven in the appropriate direction by a drive sprocket therefor driven by a hydraulic motor, the drive sprockets for the respective chains being designated 219S-227S and the motors for the respective chains being designated MA, MB, MC, MD, ME, as discussed hereinafter.

It will be observed particularly from FIG. 13 that spindle drive chains 219, 225 have relatively long reaches engaging sprockets 217 on shafts 93 of conveyor means 71 traveling continuously in the direction of forward movement of the conveyor means and that they thereby exert a force for driving the conveyor means in addition to the force exerted by indexing drive means 130, 131 for the conveying means. It is believed that this is advantageous in that it tends to reduce the force output required of indexing drive means 130, 131. While the reaches of chains 221, 223, 227 which engage sprockets 217 travel continuously in the direction opposite to that of forward movement of conveyor means 71 and thus tend to impede the forward movement of the conveyor means, these reaches are relatively short (compared to the relatively longer reaches of chains 219, 225 that engage sprockets 217) and thus are believed to have a relatively minor adverse effect on conveyor indexing. Although spindle chain drives 219-27 have been illustrated herein to effect the specified rotations of spindles 83 for purpose of disclosure, it is contemplated that means other than such spindle chain drives may be employed for effecting such specified rotation of the spindles within the scope of the invention so as to meet at least some of the objects thereof.

It will also be observed that as conveyor means 71 is indexed forwardly through an indexing step between the preselected indexed positions thereof, the forward motion of sprocket 217 on each of shafts 93 (i.e., the translatory motion of the sprockets) affects the rate of rotation of spindles 83, decrementing or incrementing them depending on the direction in which the spindles are rotating relative to the intermittent motion of the chain upon the indexing thereof. Thus, as each spindle 83 driven by the first, third and fifth chains 219, 223, 227 is indexed forwardly, its rate of rotation tends to be decreased, and as each spindle driven by second and fourth chains 221, 225 is indexed forwardly, its rate of rotation tends to be increased. For effective treatment of the cores 23, however, it has been found advantageous that spindles 83 rotate at a generally constant rate at least in preheating zone 113 to aid in achieving uniform heating and at least in adhesive application zone 115 to aid in obtaining adequate application of the liquid adhesive material. It is not believed necessary to have a constant rate of rotation of spindles 83 through reheating and cooling zones 117, 119; however, if desired, it is contemplated that such constant rate of spindle rotation may be effected through the reheating and/or cooling zones within the scope of the invention so as to meet at least some of the objects thereof. In accordance with this invention, means, indicated generally at 231 in FIG. 23B, is provided for adjusting or changing chain speeds to maintain the speed of rotation of shafts 93 and spindles 83 substantially constant as they are indexed forwardly by chains 219, 221 and 223, and this means is incorporated in hydraulic circuitry of the apparatus as described in detail hereinafter.

Liquid adhesive material is applied or dispensed onto opposite end turn groupings 45, 47 of winding means 21 of cores 23 in application zone 115 on each side of conveyor means 71 by adhesive applying means indicated in its entirety by the reference numeral 233. Adhesive applying means 223 on the B side of conveyor means 71 is identical to the one on the A side thereof, but reversed, and a description of the one will suffice for both. As shown in FIG. 15, adhesive applying means 233 comprises a plurality of sets of dispensing means, such as dispensers or spouts, one such set for each adhesive applying station S112-S119, and each such set comprises an upper inner spout 235, a lower inner spout 237, an upper outer spout 239, and a lower outer spout 241. With eight adhesive applying stations S112-S119 at each A and B side of conveyor means 71, there are eight such spouts (four spouts per set) on each side and thus eight upper inner, eight lower inner, eight upper outer and eight lower outer spouts at each side. Upper inner spouts 235 are mounted in a row on a bar 243 carried by arms 245 pivoted as indicated at 247 on frame F of apparatus 69 for swinging or pivotal movement on an axis extending longitudinally of the apparatus. Bar 243 is swingable or operated by a hydraulic cylinder 249 between a protracted or dispensing position in which it is shown in solid lines in FIG. 15 wherein the tip of each of spouts 235 is positioned above the upper or outer annular part of annular end turn grouping 47 of winding 21 on a core 23 on a spindle 83 at the respective stations S112-S119 for dispensing or applying liquid adhesive material onto the top of the outer annular part of that end turn grouping and a retracted or at-rest position wherein the tip of the spout is to the left of that end turn grouping as viewed in FIG. 15.

Lower inner spouts 237 at each A and B side of conveyor means 71 are mounted in a row on a bar 251 carried by arm 253 pivoted as indicated at 255 on frame F of apparatus 69 for swinging or pivotal movement on an axis extending longitudinally of the apparatus. Bar 251 is swingable or operated by a hydraulic cylinder 257 between a protracted or dispensing position in which it is shown in solid lines in FIG. 15 wherein the tip of each of spouts 237 is positioned within end turn grouping 47 of windings 21 on a core 23 on a spindle 83 at the respective stations S112-S119 above the lower or inner annular part of that end turn grouping for dispensing liquid adhesive material onto said inner annular part of that end turn grouping, and a retracted or at-rest position wherein the tip of the spout withdrawn from that end turn grouping (i.e., to the left of that end turn grouping as viewed in FIG. 15).

Figure 17:
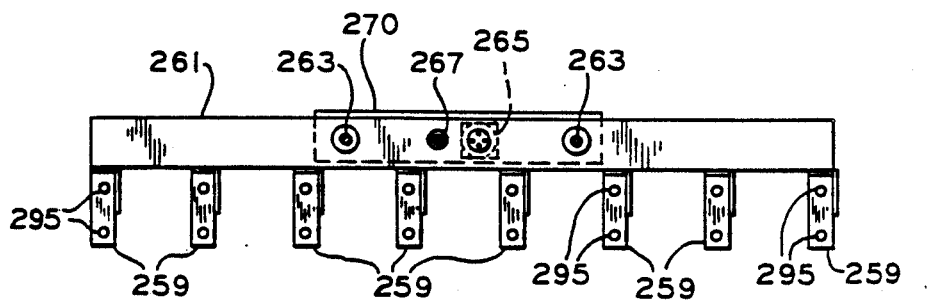
FIG. 17 is a partial sectional view taken along line 17—17 of FIG. 16.
Figure 18:
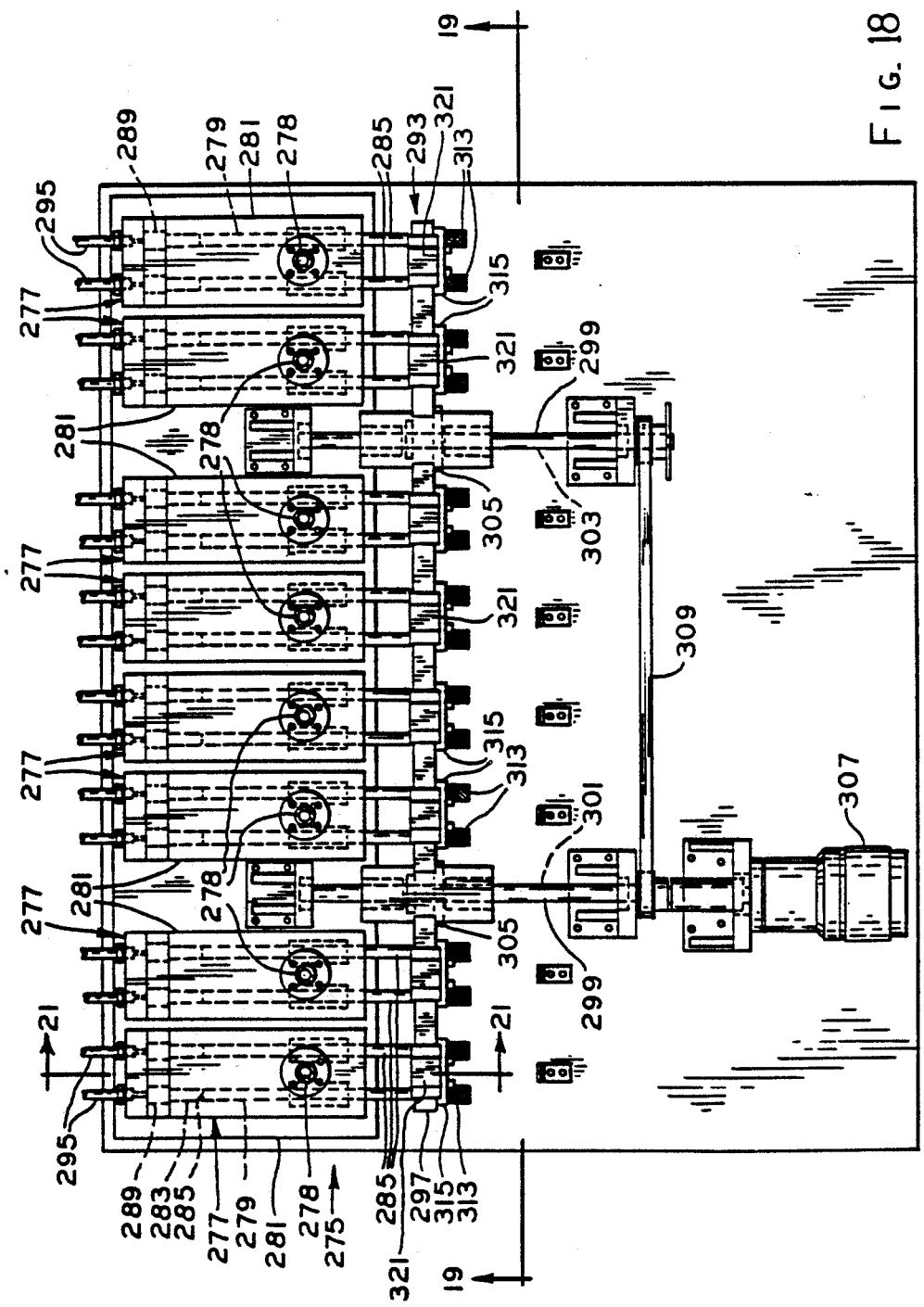
FIG. 18 is a plan view of the dispensing means for the apparatus at the dispensing station thereof.

Upper outer spouts 239 and lower outer spouts 241 are mounted generally in row formations, respectively, on a plurality of brackets 259 which extend from a carriage 261 which is reciprocally movable or slidable inwardly and outwardly on a pair of guide rods 263 (see FIGS. 17 and 18) mounted to frame F of apparatus 69 between an protracted position in which it is shown in solid lines in FIG. 15 for dispensing liquid adhesive material and a retracted position as indicated in phantom at the right in FIG. 15. In the protracted position of carriage 261 and spouts 239, 241, the tip of each upper spout 239 is positioned above the upper or outer annular part of an end turn grouping 45 of windings 21 on a core 23 on a spindle 83 at the respective stations S112–S119 for dispensing liquid adhesive material onto the top of the inner annular part of that end turn grouping, and the tip of each lower outer spout 241 is positioned within an inner annular part of that end turn grouping for dispensing liquid adhesive material downwardly onto the inner annular part of that end turn grouping. Carriage 261 is movable inwardly and outwardly by drive means, such as a power or hydraulic cylinder or the like for instance, as indicated generally at 265. A ball screw 267 is turnable in a nut 269 therefor carried on an arm 270 which is reciprocally or slidably movable on guide rods 263, and the hydraulic cylinder is mounted on arm 270. A reversible hydraulic motor 271 is connected to drive ball screw 267 in one direction or the other by a belt drive 273 to adjust the positions of spouts 239, 241 thereby to compensate for stack height variations which may occur with respect to when various different cores are treated in apparatus 69.

Figure 19:
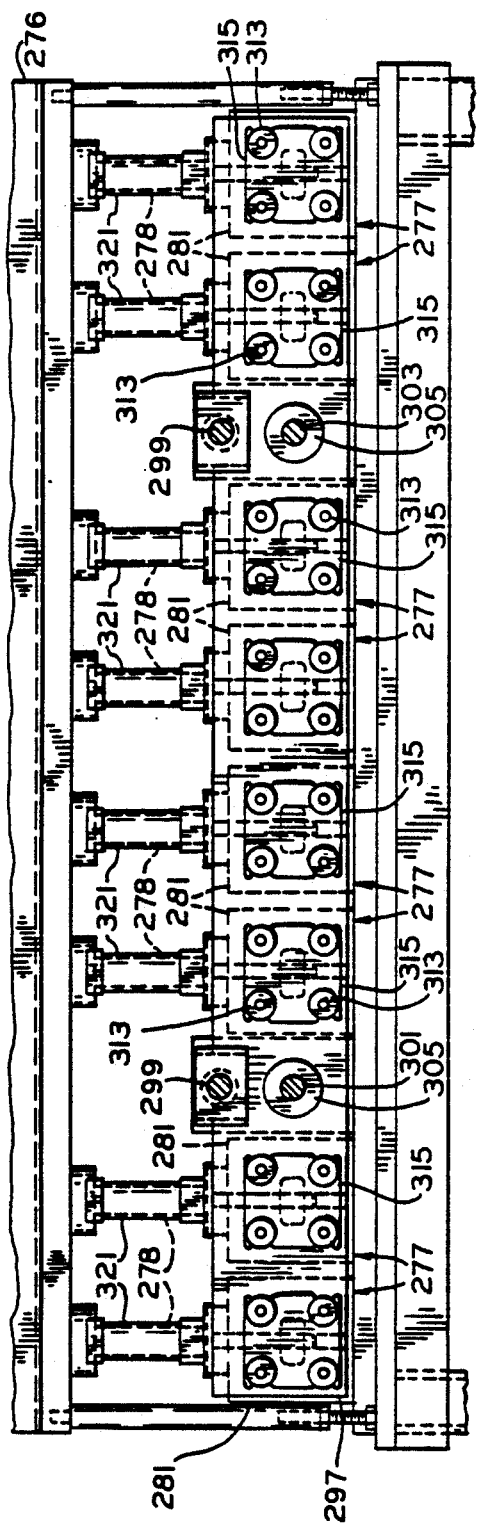
FIG. 19 is a partial sectional view taken along line 19—19 of FIG. 18.
Figure 20:
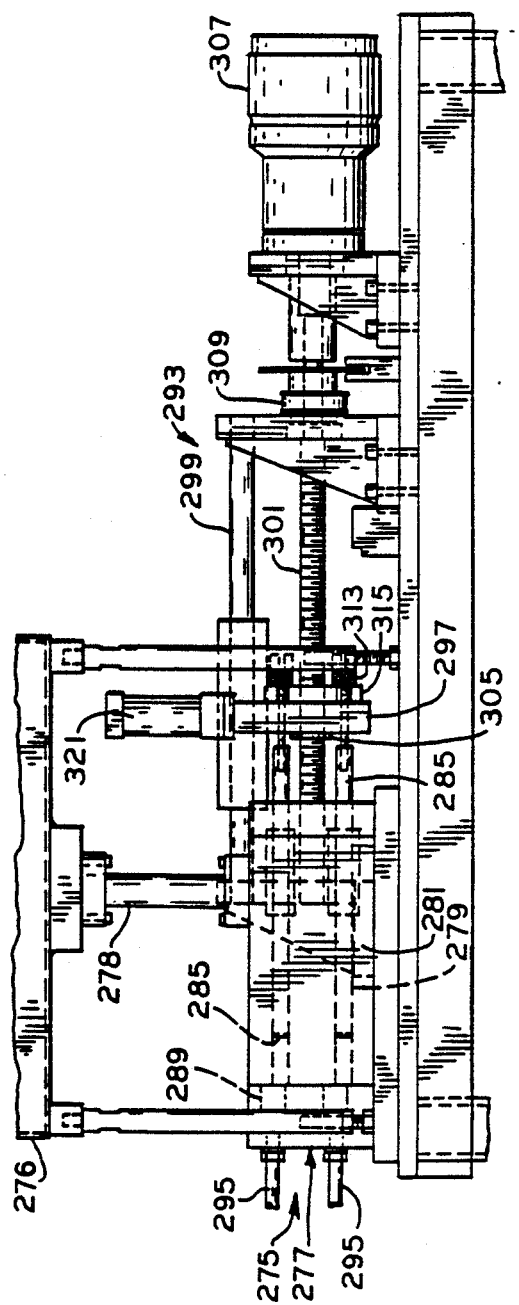
FIG. 20 is a partial left side elevational view of the dispensing means of FIG. 18.

Adhesive applying means 233 at each side of apparatus 69 includes means, indicated generally at 275 (see FIGS. 18–20), for delivering the liquid adhesive material from a supply thereof in a source or reservoir 276 to spouts 235, 237, 239, 241 of the adhesive applying means. Adhesive delivery means 233 comprises a plurality of pump units 277, one for each adhesive applying stations S112–S119 at the respective side of apparatus 69, and each pump unit is operable to deliver preselected metered volumes or doses of the liquid adhesive material from reservoir 276 to spouts 235, 237, 239, 241 at the respective adhesive applying stations. Each pump unit 277 comprises a plurality or set of pumps or pumping means each designated 279, one for each of the four respective spouts. More particularly, each pump unit 277 comprises a block having a plurality or set of pump cylinders 281 each with a chamber or chamber means 283 therein and a displacing means or pump plunger 285 slidable in each cylinder within the chambers thereof (see FIGS. 21 and 22). Each cylinder 281 has an inlet or compensation port intermediate its ends, as indicated at 287, interconnected in communication between chamber 283 and reservoir 276 by a conduit, as indicated at 278, and an outlet port 289 controlled by a one-way check valve 290 therein is provided at one end of each cylinder constituting its outlet end. The arrangement is such that on retraction of plunger or plunger means 285 away from outlet port 289 of cylinder 283, toward its other or opposite end 291, chamber 283 is primed with or receives liquid adhesive material from reservoir 276 through conduit 278 and inlet port 287; and, on movement of the plunger toward the outlet port of the cylinder thereby to effect the closing of the inlet ports by the plunger, a dose or charge of the liquid adhesive material is delivered through the outlet ports and check valve 290 therein, the preselected volume of the charge depending on the length of the stroke of the plunger past the inlet port.

Means, indicated generally at 293, is provided for operating each of the eight pump units 277 on each side of apparatus 69 for delivery of the liquid adhesive material thereby through the respective four outlets 289 and flexible delivery lines, each designated 295, to the spouts 235, 237, 239, 241 at each adhesive applying station S112–S119 at which there is a core 23 for treatment. As to any one of stations where there is no core for treatment, the respective pump units remain idle. Pump operating means 293 comprises an actuating means, such as a cross-head 297 constituted by an elongate relatively narrow plate or bar or the like for instance, spanning all pump units 277 at the respective side of the apparatus adjacent ends 291 of the units. Cross-head 297 is reciprocally movable or slidable (in the direction at right angles to its length) on guide rods 299 toward and away from ends 291 of pump units 277 and is adapted to be driven one way and the other on the guide rods by means of a pair of ball screws 301, 303 respectively threaded in a pair of nuts 305 mounted in the cross-head. Screws 301, 303 are adapted to be driven in one direction for advancing cross-head 297 and in the opposite direction for retracting the cross-head by means of a reversible hydraulic motor 307 direct-connected to screw 301 with a belt drive 309 to screw 303. The four plungers 285 of each pump unit 277 extend from ends 291 of the pump units through holes or openings 311 in cross-head 297 and are secured at their outer ends as indicated at 313 to a pusher 315 on the outside of the cross-head. Means, indicated generally at 317, is provided for releasably latching or securing each pusher 315 to cross-head 297 for movement therewith to effect operation of the respective four plungers 285, and releasably latching means 317 comprise a latch pin 319 movable by a hydraulic cylinder 321 on cross-head 297 between a latching position extending into a recess 323 in a latch block 325 on the pusher and a retracted position withdrawn from the recess. The arrangement is such that on movement of cross-head 297 by motor 307 toward ends 291 of pump units 277, each pump plunger 285 which has its pusher 315 latched to the cross-head is driven through a pumping stroke and then through a return stroke back to a retracted position by the cross-head. Any pump unit 277 may be held out of operation during a stroke of cross-head 297 by unlatching the cross-head from the respective pusher 315 for the four plungers 285 of that unit. On such unlatching, cross-head 297 simply slides forwardly and back relative to the stated four plungers without moving them.

Figure 23A:
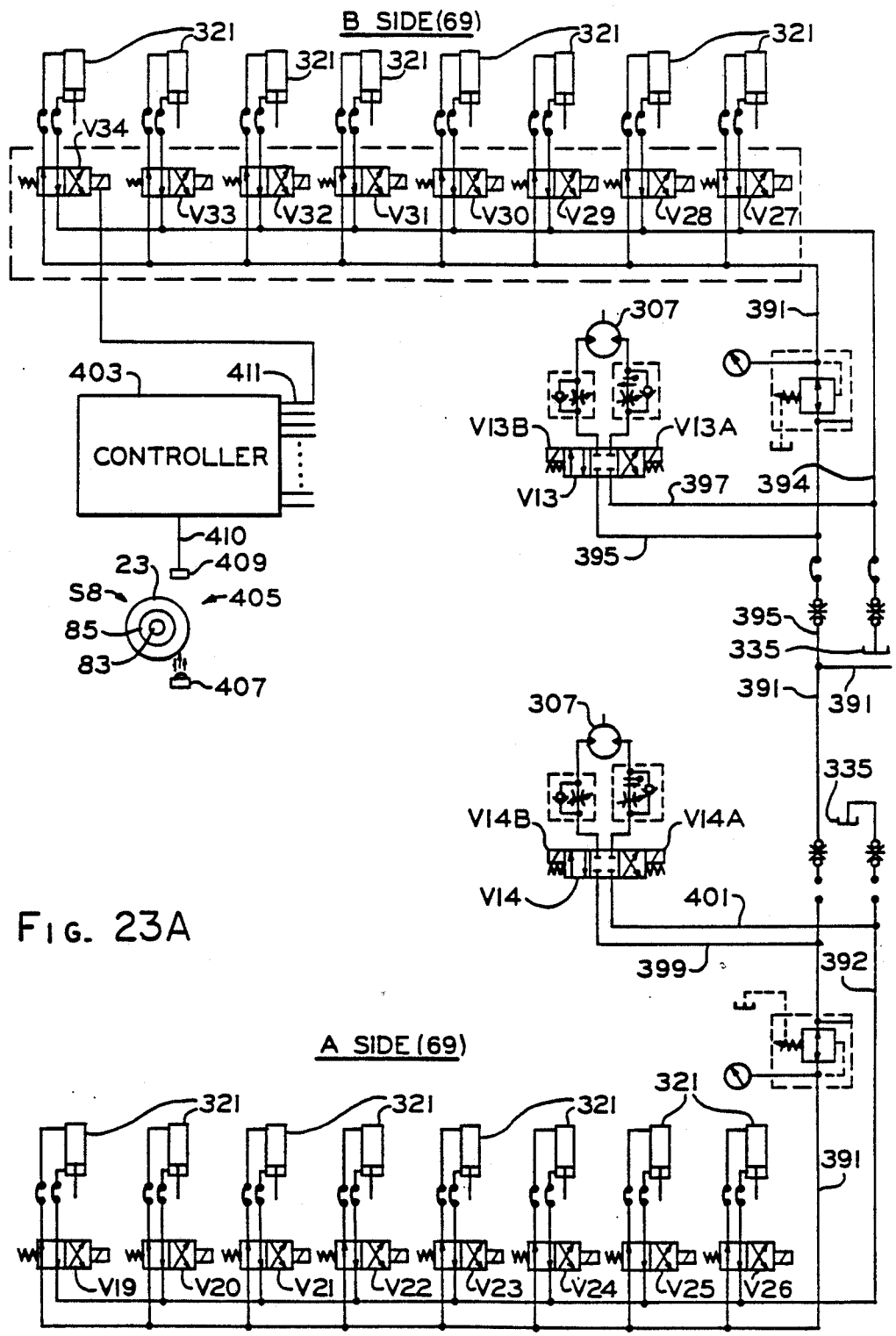
FIGS. 23A, 23B and 23C are schematic views of a hydraulic circuit for the apparatus with FIG. 23A also showing certain electrical controls therefor.
Figure 23B:
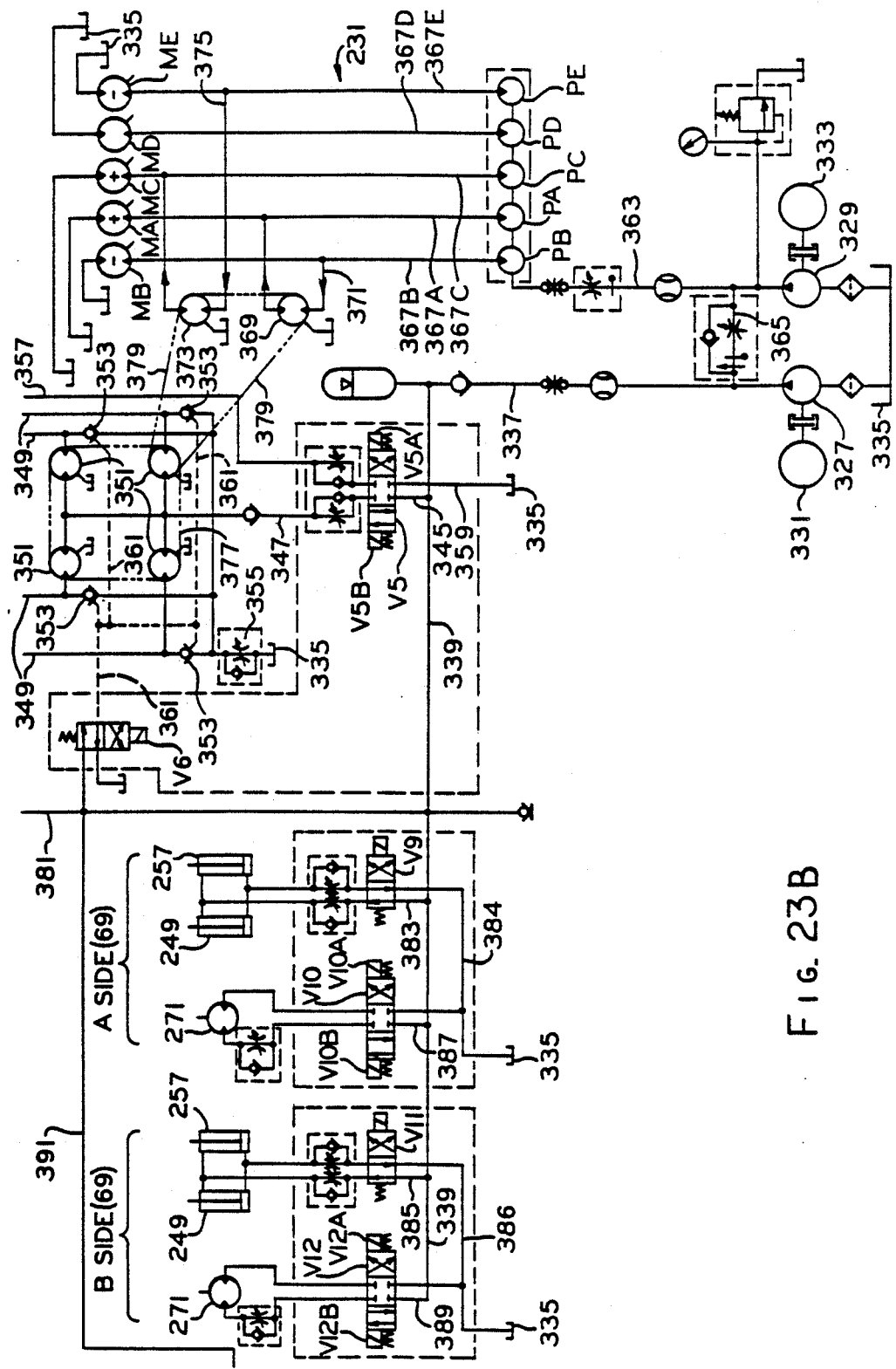
Figure 23C:
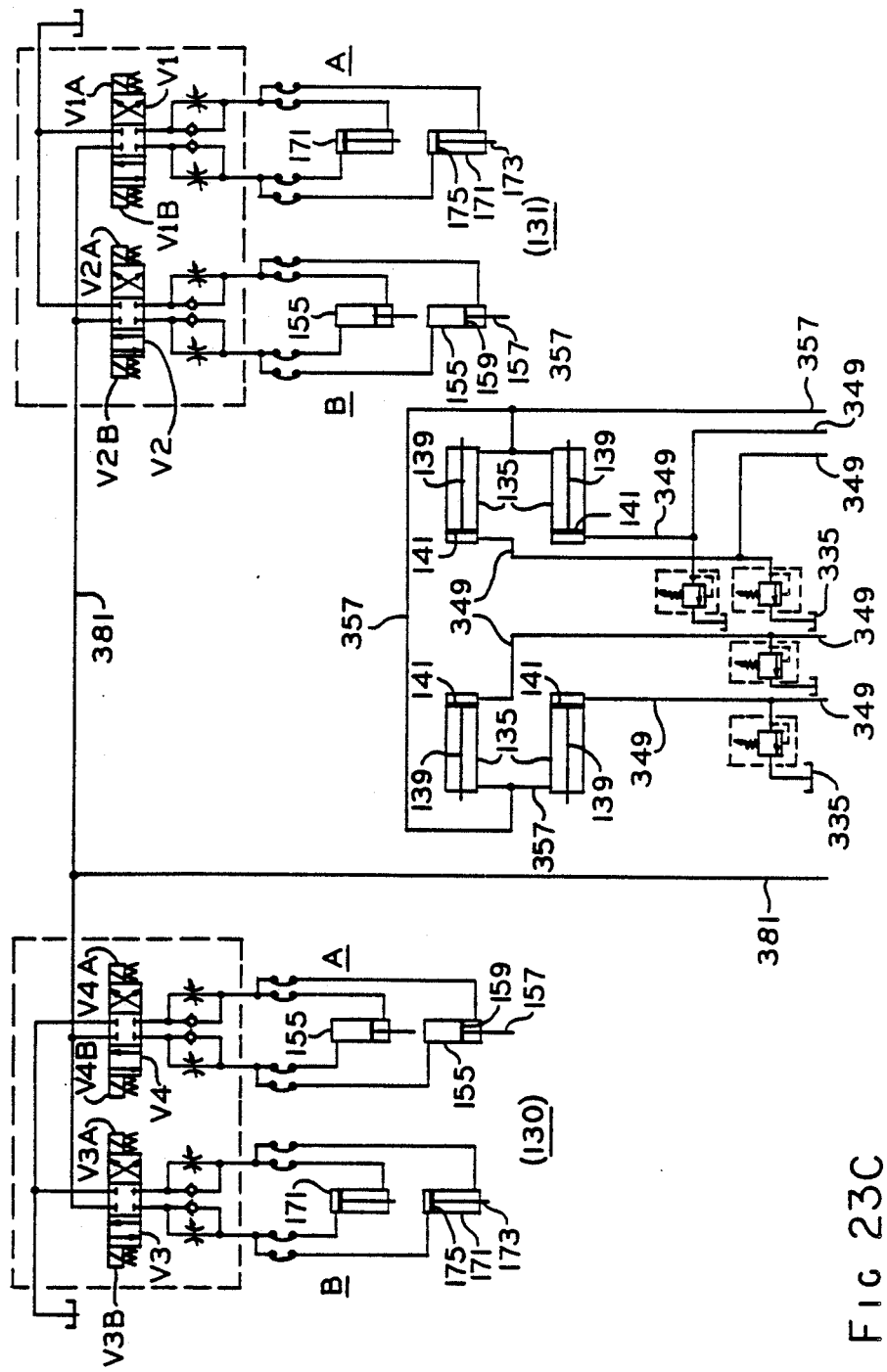

The hydraulic cylinders and hydraulic motors above described are connected in a hydraulic circuit, as shown in FIGS. 23A, 23B and 23C, which includes first and second hydraulic pumps 327, 329 driven by electric motors 331, 333, respectively. Pump 327 delivers hydraulic fluid from a sump 335 via a line 337 including conventional flow controls (not numbered) to a main delivery line 339, with an accumulator as indicated at 341. A solenoid valve V5 has an inlet connected as indicated at 345 to main delivery line 339, and an outlet for delivery of oil to a line 347 including suitable flow control means and a back check valve. A plurality of branch lines each designated 349 and each including a hydraulic motor 351 which connect line 347 to the head ends of indexing cylinders 135 through branch lines 349, respectively. Provision is made for venting the head ends of indexing cylinders 135 to sump 335 via a system including check valves 353 which normally hold pressure in branch lines 349 but which open in response to being back-pressured for delivery of fluid to the sump as indicated at 355. Solenoid valve V5 has a transfer port in communication via a network of lines or conduits 357 with the rod ends of indexing cylinders 135. Solenoid valve V5 also has two solenoids V5A, V5B, and acts on energization of solenoid V5A to deliver fluid to line 347 and thence via branch lines 349 (including motors 351) to the head ends of indexing cylinders 135 for extending their piston rods 139 to index conveyor means 71 forwardly, with accompanying venting of the transfer port and hence the line network 357 to sump 335 as indicated at 359, and on energization of solenoid V5B to deliver fluid to line network 357 and thence to the rod ends of indexing cylinders 135 for retracting piston rods 139 of these cylinders. For the retraction of piston rods 139, a solenoid valve V6 is energized to deliver fluid from main delivery line 339 via a network of lines indicated at 361 to check valves 353 to back-pressure them for venting the head ends of the indexing cylinders.

Pump 329 delivers fluid from the sump 335 via a line 363 including conventional flow controls (not numbered) to drive a hydraulic motor (not shown per se) which drives five hydraulic pumps designated PA, PB, PC, PD and PE for supplying fluid under pressure to motors MA, MB, MC, MD and ME for chain drives 219-227, respectively. A cross-connection from line 363 to line 337 for supplying fluid from line 363 to the accumulator is indicated at 365. Pumps PA-PE are connected to deliver fluid to motors MA-ME via lines 367A-367E and have outlets connected to the sump as indicated at 335. The aforesaid chain control means 231 comprises what may be called a flow divider means including a hydraulic pump 369 in a cross-connection 371 from line 367B to line 367A and a hydraulic pump 373 in a cross-connection 375 from line 367E to line 367C. The aforesaid four hydraulic motors 351 have their shafts interconnected, as schematically diagrammed at 377 in FIG. 23B, by a belt for rotation of their shafts, and are connected to drive pumps 369, 373, as indicated schematically at 379 in FIG. 23B, by means of a belt. The arrangement is such that, on indexing of conveyor means 71, the operation of motors 351 during such indexing causes operation of pump 369 to add fluid to the flow to motor MA and subtract fluid from the flow to motor MB and causes operation of pump 373 to add fluid to the flow of motor MC and subtract fluid from the flow to motor ME thereby to speed up chains 219, 223 and slow down chains 221, 227 during such indexing for maintaining the rate of rotation of the spindles 83 being driven by these chains generally constant, as previously mentioned.

As best seen in FIG. 23C, coupler-actuating cylinders 155 and lock-actuating cylinders 171 of units 133A and 133B for indexing means 131 are connected in the hydraulic circuit under control of solenoid valves V1 and V2, respectively. Similarly, coupler-actuating cylinders 155 and lock-actuating cylinders 171 of units 133A, 133B for indexing means 130 are connected in the hydraulic circuit under control of solenoid valves V3 and V4, respectively. These valves are supplied with fluid from main line 339 as indicated at 381. Each has two solenoids, as indicated at V1A, V1B, V2A, V2B, V3A, V3B and V4A, V4B, for effecting operation of the valves for the advance and retraction of couplers 151 and locks 169, as previously discussed.

Referring again to FIG. 23B, cylinders 249, 257 of adhesive applying means 233 on the A side of apparatus 69 are connected in the hydraulic circuit under control of a solenoid valve V9 supplied with fluid from the main line 339 as indicated at 383 and having a part connected to sump 335 as indicated at 384. Cylinders 249, 257 of adhesive applying means 233 on the B side of apparatus 64 are connected in the hydraulic circuit under control of a solenoid valve V11 supplied with fluid from the main line as indicated at 385 and having a part connected to sump 335 as indicated at 386. Hydraulic motor 271 of adhesive applying means 233 on the A side is connected in the hydraulic circuit under control of a solenoid valve V10 having solenoids V10A, V10B supplied with fluid from the main line as indicated at 387 and having a part connected to sump line 384. Hydraulic motor 271 of adhesive applying means 233 on the B side is connected in the hydraulic circuit under control of a solenoid valve V12 having solenoids V12A, V12B supplied with fluid from the main line as indicated at 389 and having a part connected to the sump line 386.

As illustrated in FIG. 23A, the eight hydraulic cylinders 321 of dispensing unit 275 on the A side of apparatus 69 are connected in the hydraulic circuit under control of solenoid valves V19-V26, respectively, supplied with fluid from the main line as indicated at 1 and each having a part connected to sump 335 as indicated at 392. The eight hydraulic cylinders 321 of dispensing unit 275 on the B side of apparatus 69 are connected in the hydraulic circuit under control of solenoid valves V27-V34, respectively, supplied with fluid from the main line as indicated at 391 and each having a part connected to the sump as indicated at 394. Hydraulic motor 307 for driving ball screws 301, 303 of the dispensing unit 275 on the B side is connected in the hydraulic circuit under control of a solenoid valve V13 supplied with fluid from the main line as indicated at 395 along with the cylinders 321 on the B side and has a part connected to the sump as indicated at 397. Hydraulic motor 307 for driving ball screws 301, 303 of dispensing unit 275 on the A side is connected in the hydraulic circuit under control of a solenoid valve V14 supplied with fluid from the main line as indicated at 399 along with cylinders 321 on the A side and has a part connected to the sump as indicated at 401.

Actuation of the valves V1-V34 of the hydraulic circuit is under control of a programmable controller, preferably a GE Series Six programmable controller sold by the assignee of this invention, indicated at 403 in FIG. 23A. Associated with the controller 403 is a means indicated at 405 for sensing if a core is loaded on a spindle 83. This means, as illustrated, may be a photosensor system comprising a lamp 407 directing a beam of light toward a photocell 409 at one of the stations, e.g., station S8 in the loading zone 111, with the arrangement such that a core loaded on the spindle at that station interrupts the beam. The information as to a core being loaded on a spindle as detected by the photocell is transmitted as indicated at 410 to and stored in a 284-part shift register of the controller and shifted on each indexing movement of conveyor means 71 for a purpose that will appear. Controller 403 controls the energization of infrared lamps 209 of apparatus 69 and is interconnected with the valves V1-V34 by lines such as indicated at 411 in FIG. 23A. Controller 403 is programmed for operation of apparatus 69 as discussed hereinafter.

Valves V1-V5 are intermittently actuated to effect conjoint operation of the four conveyor index cylinders 135 of conveyor indexing means 130, 131 to index conveyor means 71 forwardly the stated index distance between the preselected indexed positions thereof. Actuation of valves V1, V3 effects operation of cylinders 171 to retract locks 169 for chains 87A, 87B of conveyor means 71. Actuation of valves V2, V4 effects operation of cylinders 155 to effect the coupling of couplers 151 associated with carriages 145 to pins 91 of chains 87A, 87B. Actuation of valve V5 effects conjoint operation of cylinders 135 for indexing means 130, 131 to index conveyor means 71 forwardly Upon completion of the forward indexing stroke of piston rods 139 of cylinders 135, valves V1 and V3 are deactuated for the retraction of carriages 145 by cylinders 135, and valves V2 and V4 are deactuated for effecting locking of chains 87A, 87B by chain locks 169. Controller 403 effects or times the indexing to occur at preselected intervals, and spindles 83 dwell for a preselected period at the spindle dwell stations or indexed positions S1-S284 thereof. Thus, the indexing of conveyor means 71 may occur at any preselected time interval, such as for instance at one and one-half minute intervals, during the operation of apparatus 69 which allows for ample time of dwell of spindles 83 at unloading stations S1-S4 for unloading and loading of cores 23 thereon, and for ample time of dwell of the spindles at loading stations S5-S8 for chucking the cores thereon.

In the operation of apparatus 69, cores 23 are loaded on spindles 83 in loading zone 111 during the dwell of the spindles at their preselected indexed positions therein. Cores 23 may be loaded on spindles on the A side only of apparatus 69, or on spindles on the B side only, or on spindles on both the A and B sides, as desired. Loading of cores 23 may be carried out at stations S5-S8, and such loading is effected by using chucking means 85 which grips both the spindle 83 and the core thereby to grip the core on the spindle for rotation therewith. While both the loading and unloading of cores 23 with respect to spindles 83 is discussed herein as being manually accomplished for purposes of disclosure, it is contemplated that such loading and unloading may be accomplished automatically through the use of suitable means, such as for instance, automatic loading and unloading equipment or robots or the like, within the scope of the invention so as to meet at least some of the objects thereof. Core 23 is axially located on spindle 83 by engagement of chucking means 85 (holding the core) against a stop collar 411 (see FIG. 10) on the spindle; thus, all cores on the A side have their inner sides or end faces (inner in relation to the spindle) in a common plane and all the cores on the B side have their inner sides or end faces in a common plane, these planes being appropriate to the location of the ends of the inner spouts 235, 237 at the adhesive applying stations S112-S119 in the operative position of the spouts. Thus, whatever the stack height of a core, its inner end face is positioned for delivery of the liquid adhesive material onto winding means 21 thereof by inner spouts 235 and 237.

Considering a spindle 83 either on the A side or on the B side of apparatus 69 starting at station S1 on the respective side thereof, such spindle is indexed around through one circuit of its predetermined course or path, dwelling for a preselected dwell interval or time period at each of stations or preselected indexed positions S1-S284, then returning to station S1 and repeating the circuit. Treated cores are unloaded from spindles 83 at stations S1-S4, clearing the spindles for the loading of other untreated cores at stations S5-S8. A core 23, loaded on a spindle 83 at any one of stations S5-S8, breaks the light beam at station S8 to supply information to the aforesaid shift register in controller 403 that there is a core on that specific spindle, and such specific spindle with the core thereon then completes the circuit, dwelling at each of stations S9-S284 and returning to station S1.

Exiting from loading zone 111, a spindle 83 with a core 23 thereon enters tunnel 195 of preheating zone 113 (at the respective side A or B) and progresses from station to station with a dwell at each of stations S11-S110 of the preheating zone. Spindle 83 starts rotating in the aforesaid counterclockwise direction, as viewed in FIGS. 1A, 1B and 13, at station S11 and continues rotating in that direction through preheating zone 113 and continues on into adhesive applying zone 115 to station S115. This counterclockwise rotation is effected by drive chain 219 acting on sprockets 217 on spindle shafts 93, as discussed in detail hereinbefore. As core 23, rotating as described, progresses forwardly from station S11 to station S60 and dwells at these stations, it is heated by infrared lamps 209 in this section of tunnel 195 to the preselected preheat temperature for driving off volatiles from the winding means of the core and for craze stress relief of the magnet wire of winding means 21. As cores 23 next progresses through stations S61 and S90, it may be held generally at the preselected preheat temperature, and then as it progresses from station S91 to station S110, the core may be cooled to a somewhat lower preheat temperature but still within the aforementioned preheat temperature range suitable for the application of the adhesive material thereonto, as discussed below.

Exiting from preheating zone 113, the spindle 83 under consideration with preheated core 23 thereon enters adhesive applying zone 115. As previously mentioned, cores 23 may be mounted or loaded onto every spindle or those spindles as may be convenient. Assuming that the spindle 83 under consideration exiting from preheating zone 113 is indexed to station S112 and while it is rotating in the counterclockwise direction at station S112, valve V9 for the A side and valve V11 for the B side are actuated to effect operation of cylinders 249 257 (on both sides) to swing the inner upper and lower spouts 235, 237 out to their operative or applying positions, and valve V10 for the A side and valve V12 for the B side are actuated to operate motors 271 to move outer upper and lower spouts 239, 241 inwardly to their operative or applying position.

With the aforementioned spouts in their respective applying positions for delivery of liquid adhesive material to winding means 21 of cores 23 at the adhesive applying stations of apparatus 69, controller 403 effects operation of valves V13, V14 to actuate hydraulic motors 307 for the A and B sides thereby to drive crossheads 297 of adhesive applying means 233 at each side in the direction for effecting a pumping stroke of pump plungers 285. In response to information received by controller 403 from the aforesaid shift register that there is a core on the spindle 83 at station S112, e.g., on the A side, the controller effects the actuation of valve V19 thereby to actuate the respective cylinder 321 to latch the four plungers 285 of the respective pump unit 277 to cross-head 297. As a result, these four plungers 285 are driven through a pumping stroke to deliver metered charged of the liquid adhesive material therefrom through flexible lines 295 to spouts 235, 237, 239, 241 at the stated adhesive applying station S112. Following this delivery of the liquid adhesive material, valves V13, V14, V19 are deactuated, cross-heads 297 are retracted for retraction of plungers 285 and pumping of pump units 277, and valves V9–V12 are deactuated for retraction of spouts 235, 237, 239, 241. During the delivery or dispensing of the liquid adhesive material, spouts 235, 237, 239, 241 are respectively disposed in predetermined positions with respect to opposite end turn groupings 45, 47 of winding means 21 on cores 23, as previously discussed. The spindle 83 under consideration carrying core 23 is then indexed to adhesive applying station S114 where the core receives a second treatment of liquid adhesive material in the same manner as at station S112, the liquid adhesive material being delivered to the four spouts at station S112 by the four plungers 285 of pump unit 277 associated with station S112. At station S114, the treatment is again with spindle 83 and core 23 rotating in the counterclockwise direction, as at station S112.

The spindle 83 under consideration carrying core 23 is then indexed to adhesive applying station S116 where the core receives a third treatment of the liquid adhesive material in the same manner as at stations S112, S114, except that here the core is rotating in a clockwise direction, opposite to that at stations S112, S114, i.e., clockwise as viewed in FIGS. 1B and 13. The liquid adhesive material is delivered to the four spouts at station S116 by the four plungers 285 of pump unit 277 associated with station S116. The spindle 83 under consideration carrying core 23 is then indexed to adhesive applying station S118, where the core receives a fourth treatment of the liquid adhesive material in the same manner as at station S116, the liquid adhesive material being delivered to the four spouts at station S118 by the four plungers 285 of pump unit 277 associated with station S118. At station S118, the treatment is again with the core rotating in the second direction, as at station S116. While spindles 83 with cores 23 thereon are discussed as being rotated in opposite directions at the adhesive applying stations of apparatus 69 for purposes of disclosure, it is contemplated that a fewer or greater number of such adhesive applying stations may be employed with the rotation of such spindles and cores being in either of the clockwise or counterclockwise rotations at such adhesive applying stations, as desired, within the scope of the invention so as to meet at least some of the objects thereof.

As the spindle 83 under consideration carrying core 23 exits from adhesive applying zone 115 with the core having been treated or having received the liquid adhesive material, as discussed above, such spindle and core then progress through reheating zone 117. In reheating zone 117, the treated cores are heated at a preselected reheat temperature in a solvent release section of this zone for driving off the solvent from the applied liquid adhesive material contained in winding means 21 of cores 23 and to effect gelling of such applied liquid adhesive material, and thereafter in another heating section of this zone, the treated cores are further heated for curing the applied adhesive material, resulting in the solidification or hardening thereof of the adhesive. Upon the hardening of the adhesive material in core 23, the core progresses from reheating zone 117 through cooling zone 119 where it is cooled so that it may be handled, and thence to unloading zone 121 (stations S1–S4) where it is unloaded from the spindle 83 under consideration so that the latter is prepared for being loaded for the next circuit through apparatus 69 when it is indexed into loading zone 111.

As previously noted, cores 23 may be loaded on all spindles 83 on each of the A and B sides or only onto those spindles as convenient. When all spindles 83 are loaded once the spindles have made a complete circuit through apparatus 69, there will be cores on the spindles at each of stations S8–S284, at any of stations S1–S4 where spindles have not yet been unloaded, and at any of stations S5–S7 where spindles have been loaded. Thus, there will be cores 23 at each of the eight stations S112–S119 on each side of apparatus 69 in adhesive applying zone 115, and the eight cores on each side will be simultaneously treated. When a spindle 83 is not loaded with a core 23, delivery of liquid adhesive material to the four stations where there are no cores on the spindle (e.g., stations S113, S115, S117 and S119) is inhibited or obviated by reason of the control effected by photosensor system 405 and the aforementioned shift register over controller 403 and the operation of latch pins 319, inhibition being by way of pushers 315 related to the empty spindles and being unlatched from the cross-head 297, as previously discussed.

Referring particularly to FIG. 13, it will be observed that cores 23 on any spindles 83 at stations S11–S115 in preheating and applying zones 113, 115 on each of sides A and B of apparatus 69 are continuously rotated in the counterclockwise direction by drive chain 219 in mesh with sprockets 217 on the shafts 83. Downstream from station S115, the rotation of core S23 in the counterclockwise direction is terminated, and from station S116 through station S128, rotation of the cores is in the clockwise direction by means of drive chain 221. Reversal of rotation back to the counterclockwise direction occurs at station S129, and such rotation continues in the counterclockwise direction to station S142 by means of drive chain 223. Further reversal of rotation to the clockwise direction occurs at station S143 and continues to station S271 by means of drive chain 225. Thereafter, reversal back to the counterclockwise direction occurs at station S272 and continues to station S284 by means of drive chain 227. Spindles 83 are idle at stations S1–S10 for the above discussed unloading and loading operations.

Apparatus 69 is capable of handling cores 23 having different stack heights (i.e., different axial dimensions from end face to end face) within a preselected range of such stack heights. In this regard, it is to be noted, as pointed out above, that all cores 23 on each side of apparatus 69 have their inner end faces generally in respective common planes, and thus the inner spout systems serve cores of all sizes within the preselected stack height range. Outer spouts 239, 241, however, need to be brought to different positions for cores of different stack heights, and this is effected by programming controller 403 to operate hydraulic motors 271 for an interval such as to drive arms 170 carrying hydraulic motor 265 to adjust its position and that of carriage 261 and the outer spouts the distance necessary to bring the tips of the outer spouts to the respective applying positions with respect to the cores of the different stack heights undergoing treatment.

Pumps 279 function to meter a preselected amount of liquid adhesive material delivered to the spouts in accordance with the length of the pumping stroke of their plungers 285, and the stroke of the plungers is determined by the interval of operation of hydraulic motors 397 for driving cross-heads 297 as programmed in controller 403.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

We claim:

1. Apparatus adapted to treat with a hardenable liquid adhesive material a plurality of cores each having winding means with a pair of opposite end turn groupings thereon, the apparatus comprising:

an endless conveyor means operable generally in a predetermined course for discrete intermittent movements between a plurality of preselected indexed positions defined in the predetermined course, said endless conveyor means including a pair of sets of rail means for establishing the predetermined course thereof, a pair of endless chains each having a plurality of links with a pair of opposite ends thereon, a pair of sets of means for rolling in engagement with said rail means sets and interconnected between adjacent opposite ends of said links in said chains, a plurality of shafts each having a pair of opposite end portions rotatably received in said rolling means, a plurality of sprockets on said shafts, and a pair of sets of spindle means disposed on said opposite end portions of said shafts for carrying the cores, said spindle means being conjointly movable with said endless conveyor means so as to be disposed in the preselected indexed positions thereof upon the discrete intermittent movements of said endless conveyor means, respectively;

means operable generally for imparting the discrete intermittent movements to said endless conveyor means, said imparting means including a pair of means actuated intermittently for driving said chains conjointly, a pair of means associated with said driving means and operable for coupling in engagement with parts of confronting ones of said rolling means when said spindle means are disposed in the preselected indexed positions thereof, and a pair of motors for moving said driving means in opposite directions to conjointly drive said chains only when said coupling means are engaged with said parts of said confronting ones of said rolling means and impart thereby the discrete intermittent movements to said endless conveyor means between the preselected indexed positions, respectively;

a plurality of sets of means associated with said endless conveyor means and movably arranged at some of the preselected indexed positions for dispensing the liquid adhesive material onto the opposite end turn groupings of the winding means of the cores carried on said spindle means upon the movement of said spindle means into the some preselected indexed positions, said dispensing means sets each including a pair of sets of spouts with each spout set being selectively conjointly movable between an at-rest position and a liquid adhesive material dispensing position in predetermined spaced relation with one of the opposite end turn groupings of the winding means of the cores carried on said spindle means at least upon the movement thereof into the some preselected indexed positions, respectively;

a set of other endless chains arranged to engage said sprockets to effect rotation of said shafts and spindle means in one direction at least upon the movement of said spindle means into some of the some preselected indexed positions and in another direction opposite the one direction at least upon the movement of said spindle means into some others of the some preselected indexed positions, respectively;

a plurality of sets of means for delivering the liquid adhesive material to said dispensing means sets, said delivering means sets each including a set of cylinders each having a chamber means therein for receiving the liquid adhesive material, a set of outlet ports in said cylinders communicating said chamber means with said spouts, a set of plunger means movable in said cylinders and operable generally for displacing liquid adhesive material from said chamber means through said outlet ports to said spouts, means selectively actuated for conjointly moving said plunger means to effect the operations thereof, and set of latching means on said conjointly moving means arranged in releasable engagement with said plunger means and selectively operable in the event that a spindle means without a core carried thereon is moved into any one of the some preselected indexed positions for releasing any one of said plunger means arranged in the releasable engagement therewith and obviating thereby the operation of said any one plunger means upon the selective actuation of said conjointly moving means, respectively;

a pair of sets of first heating means disposed at least at others of the preselected indexed positions in the predetermined course of said endless conveyor means preceding the some preselected indexed positions therein and operable generally for heating the cores carried on said spindle means at least to a preselected temperature within a preselected temperature range upon the movement of said spindle means between the other preselected indexed positions, respectively; and a pair of sets of second heating means disposed at least at some others of the preselected indexed positions in the predetermined course of said endless conveyor means subsequent to the some preselected indexed positions therein and operable generally for heating the cores carried on said spindle means at least to another preselected temperature within another preselected temperature range thereby to effect curing of the liquid adhesive material with which the cores are treated upon the movement of said spindle means between the some other preselected indexed positions, respectively.

2. Apparatus adapted to treat with a hardenable liquid adhesive material a plurality of cores each having winding means with a pair of opposite end turn groupings thereon, the apparatus comprising:

an endless conveyor means operable generally in a predetermined course for discrete intermittent movements between a plurality of preselected indexed positions defined in the predetermined course, said endless conveyor means including a pair of sets of rail means for establishing the predetermined course thereof, a pair of endless chains each having a plurality of links with a pair of opposite ends thereon, a pair of sets of means for rolling in engagement with said rail means sets and interconnected between adjacent opposite ends of said links in said chains, a plurality of shafts each having a pair of opposite end portions rotatably received in said rolling means, and a pair of sets of spindle means disposed on said opposite end portions of said shafts for carrying the cores, said spindle means being conjointly movable with said endless conveyor means so as to be disposed in the preselected indexed positions thereof upon the discrete intermittent movements of said endless conveyor means, respectively; and means operable generally for imparting the discrete intermittent movements to said endless conveyor means, said imparting means including a pair of means actuated intermittently for driving said chains conjointly, a pair of means associated with said driving means and operable for coupling in engagement with parts of confronting ones of said rolling means when said spindle means are disposed in the preselected indexed positions thereof, and a pair of motors for moving said driving means in opposite directions to conjointly drive said chains only when said coupling means sets are engaged with said parts of said confronting ones of said rolling means and impart thereby the discrete intermittent movements to said endless conveyor means between the preselected indexed positions, respectively.

3. Apparatus as set forth in claim 2 further comprising a pair of sets of heating means disposed at least at others of the preselected indexed positions in the predetermined course of said endless conveyor means preceding the some preselected indexed positions therein and operable generally for heating the cores carried on said spindle means at least to a preselected temperature within a preselected temperature range upon the movement of said spindle means between the other preselected indexed positions, respectively.

4. Apparatus as set forth in claim 2 further comprising a pair of sets of heating means disposed at least at others of the preselected indexed positions in the predetermined course of said endless conveyor means subsequent to the some preselected indexed positions therein and operable generally for heating the cores carried on said spindle means at least to a preselected temperature within a preselected temperature range thereby to effect curing of the liquid adhesive material with which the cores are treated upon the movement of said spindle means between the other preselected indexed positions, respectively.

5. Apparatus as set forth in claim 2 further comprising a plurality of sprockets on said shafts, and a set of other endless chains arranged to engage said sockets and effect rotation of said shafts and said spindle means in one direction at least upon the movement of said spindle means into some of the some preselected indexed positions and in another direction opposite the one direction at least upon the movement of said spindle means into others of the preselected indexed positions, respectively.

6. Apparatus as set forth in claim 2 further comprising a plurality of sets of means associated with said endless conveyor means and movably arranged at some of the preselected indexed positions for dispensing the liquid adhesive material onto the opposite end turn groupings of the winding means of the cores carried on said spindle means upon the movement of said spindle means into the some preselected indexed positions, respectively.

7. Apparatus as set forth in claim 6 wherein said dispensing means sets each include a pair of sets of spouts with each spout being movable between an at-rest position and a liquid adhesive material dispensing position in spaced relation with one of the opposite end turn groupings of the winding means of the cores carried on said spindle means at least upon the movement thereof into the some preselected positions.

8. Apparatus as set forth in claim 7 further comprising a plurality of sets of means for delivering the liquid adhesive material to said dispensing means sets, said delivering means sets each including a set of cylinders each having a chamber means therein for receiving the liquid adhesive material, a set of outlet ports in said cylinders communicating said chamber means with said spouts, a set of plunger means movable in said cylinders and operable generally for displacing liquid adhesive material from said chamber means through said outlet ports to said spouts, means selectively actuated for conjointly moving said plunger means to effect the operations thereof, and a set of latching means on said conjointly moving means arranged in releasable engagement with said plunger means and selectively operable in the event that a spindle means without a core carried thereon is moved into any one of the some preselected indexed positions for releasing any one of said plunger means arranged in the releasable engagement therewith and obviating thereby the operation of said any one plunger means upon the selective actuation of said conjointly moving means, respectively.

9. Apparatus as set forth in claim 7 further comprising a plurality of sets of means for delivering the liquid adhesive material to said dispensing means sets, respectively.

10. Apparatus adapted to treat with a hardenable liquid adhesive material a plurality of cores each having winding means with a pair of opposite end turn groupings thereon, the apparatus comprising:

an endless conveyor means having a predetermined course and operable generally for discrete intermittent movement between a plurality of preselected indexed positions defined in the predetermined course and having a predetermined dwell period in each indexed position;

at least one set of means associated with said endless conveyor means and conjointly movable therewith for carrying the cores between the preselected indexed positions, respectively;

at least one set of means arranged generally at some of the preselected indexed positions for dispensing the liquid adhesive material onto at least one of the opposite end turn groupings on the winding means of the cores when the carrying means are in the some preselected indexed positions, respectively; and at least one set of means intermittently operable generally for coupling in engagement with said endless conveyor means during each dwell period and movable generally in opposite directions to impart the discrete intermittent movements to said endless conveyor means, respectively.

11. Apparatus adapted to treat with a hardenable liquid adhesive material a plurality of cores each having a winding means with a pair of opposite end turn groupings thereon, the apparatus comprising:
   endless conveyor means operable generally for discrete intermittent movement through a predetermined course therefor with a preselected dwell period between each of the discrete intermittent movements of said endless conveyor means, respectively;
   means operable generally for driving said endless conveyor means, said driving means including coupling means movable from a retracted position into a protracted position for coupling engagement with a confronting part of said endless conveyor means only during respective ones of the preselected dwell periods, and means operable generally for moving said coupling means to impart to said endless conveyor means the discrete intermittent movements thereof only when said coupling means is in its protracted position in the coupling engagement with said confronting part of said endless conveyor means.

12. Apparatus as set forth in claim 11 further comprising means associated with said endless conveyor means during the preselected dwell periods thereof for retaining said endless conveyor means against movement opposite the discrete intermittent movements thereof.

13. Apparatus as set forth in claim 11 further comprising another like driving means for driving said endless conveyor means and spaced from said first named driving means in the predetermined course of said endless conveyor means, said first named and another like driving means being conjointly movable in opposite directions to impart to said endless conveyor means the discrete intermittent movements thereof, respectively.

14. Apparatus as set forth in claim 11 further comprising at least one set of means rotatably associated with said endless conveyor means and conjointly movable therewith for carrying the cores, and at least one set of means operable generally for dispensing the liquid adhesive material onto at least one of the opposite end turn groupings of the winding means of the cores disposed on some of said carrying means only during the preselected dwell periods of said endless conveyor means, respectively.

15. Apparatus as set forth in claim 14 further comprising at least a pair of sets of means for effecting the rotation in one direction of some of said some carrying means and the rotation in another direction opposite the one direction of others of said some carrying means at least during the preselected dwell period of said endless conveyor means, respectively.

16. Apparatus as set forth in claim 14 further comprising means operable generally for obviating the operation of any one of said dispensing means in the event that any one of said some carrying means is not carrying a core thereon.

17. Apparatus adapted to treat with a hardenable liquid adhesive material a plurality of cores each having winding means with a pair of opposite end turn groupings thereon, the apparatus comprising:
   at least one set of means intermittently movable between a plurality of preselected indexed positions for carrying the cores, respectively;
   means for intermittently moving said carrying means between the preselected indexed position;
   at least one set of means for affecting the rotation of said carrying means in one direction at some of the preselected indexed positions and another direction opposite the one direction at some others of the preselected indexed positions, respectively;
   means associated with said rotation effecting means for adjusting the rotational speeds of said carrying means to maintain the rotational speeds at least generally constant thereby to compensate for the intermittent movement of said carrying means between the some preselected indexed position and the some others of the preselected indexed positions, respectively;
   at least one set of means arranged generally at at least some of the some preselected indexed position and at at least some of the some others of the preselected indexed positions and operable generally for dispensing the liquid adhesive material onto at least one of the opposite end turn groupings of the cores carried on said carrying means upon the intermittent movement of said carrying means into the some preselected indexed positions and the some others of the preselected indexed positions;
   at least one set of pumping means for delivering the liquid adhesive material to said dispensing means; and
   means for disabling any one of said pumping means thereby to obviate the delivery of the liquid adhesive material to said dispensing means to any one of the some preselected indexed positions and the others of the preselected indexed positions upon the movement thereinto of any one of the carrying means without one of the cores thereon, respectively.

18. Apparatus adapted to dispense a hardenable liquid adhesive material from a source thereof, the apparatus comprising:
   a plurality of cylinders including a plurality of chamber means for receiving the liquid adhesive material from the source thereof, respectively;
   a plurality of plunger means movable in said cylinders and operable generally for displacing liquid adhesive material from said chamber means, respectively;
   means selectively actuated for conjointly moving said plunger means to effect the operations thereof; and
   a plurality of latching means associated in releasable engagement with said plunger means and selectively operable in response to the occurrence of a preselected condition for releasing at least one of said plunger means associated in the releasable engagement therewith and obviating thereby the operation of said at least one plunger means upon the selective actuation of said conjointly moving means, respectively.

19. Apparatus as set forth in claim 18 further comprising a plurality of means associated with said plunger means for interrupting communication between said chamber means and the liquid adhesive material supply upon the movement of said plunger means to displace the liquid adhesive material from said chamber means, respectively.

20. Apparatus as set forth in claim 18 further comprising a plurality of means associated with said chamber means and operable generally for passing the displaced liquid adhesive material from said chamber means in one direction and for preventing return flow into said chamber means of the displaced liquid adhesive material, respectively.

21. Apparatus as set forth in claim 18 further comprising a plurality of means adjustably associated with said plunger means and said conjointly moving means for adjusting the movement of said plunger means in said chamber means thereby to adjustably predetermine the volume of the liquid adhesive material displaced from said chamber means, respectively.

22. Apparatus as set forth in claim 18 wherein said latching means include a plurality of latch pins movable between an at-rest position in releasable engagement with said plunger means and a displaced position disengaged from said plunger means, and a plurality of selectively operable means for moving said latch pins from their at-rest positions to their displaced positions, respectively.

23. Apparatus as set forth in claim 18 wherein said conjointly moving means includes actuating means for interconnection with said plunger means, and motion transmitting means drivingly associated with said actuating means for effecting the conjoint movement of said plunger means with said actuating means.

24. Apparatus as set forth in claim 23 wherein said motion transmitting means includes a plurality of ball screws mounted to said actuating means, a plurality of drive screws drivingly received in said ball screws, respectively, and means for conjointly rotating said drive screws within said ball screws thereby to drive said actuating means and effect the conjoint movement of said plunger means in said chamber means.

25. Apparatus adapted to treat with a hardenable liquid adhesive material a plurality of cores each having winding means with a pair of opposite end turn groupings thereon, the apparatus comprising:
   endless conveyor means operable generally for discrete intermittent movements through a predetermined course therefor with a preselected dwell period between each of the intermittent movements of said endless conveyor means, respectively;
   means operable generally for driving said endless conveyor means and including means associated with said driving means and movable for coupling in engagement with a confronting part of said endless conveyor means during the preselected dwell period thereof, and means selectively operable for intermittently moving said coupling means to impart to said endless conveyor means the discrete intermittent movements thereof only when said coupling means are in the engagement thereof with said confronting part of said endless conveyor means, respectively; and
   another like driving means for driving said endless conveyor means and spaced from said first named driving means in the predetermined course of said endless conveyor means, said first named and another like driving means being conjointly movable in opposite directions to impart to said endless conveyor means the discrete intermittent movements thereof, respectively.

26. Apparatus as set forth in claim 25 further comprising at least a set of means associated with said endless conveyor means during the preselected dwell periods for retaining said endless conveyor means against movement opposite the discrete intermittent movements thereof, respectively.

27. Apparatus as set forth in claim 25 further comprising at least one set of means rotatably associated with said endless conveyor means and conjointly movable therewith for carrying the cores.

28. Apparatus as set forth in claim 27 further comprising at least a pair of sets of means for effecting the rotation in one direction of at least some of said carrying means and the rotation in another direction opposite the one direction of others of said at least some carrying means at least during the preselected dwell period of said endless conveyor means, respectively.

29. Apparatus as set forth in claim 27 further comprising at least one set of means operable generally for dispensing the liquid adhesive material onto at least one of the opposite end turn groupings of the cores disposed on some of said carrying means only during the preselected dwell periods of said endless conveyor means, respectively.

30. Apparatus as set forth in claim 29 further comprising means operable generally for obviating the operation of any one of said dispensing means in the event that any one of said carrying means is not carrying a core thereon.

31. Apparatus adapted to treat with a hardenable liquid adhesive material a plurality of cores each having winding means with a pair of opposite end turn groupings thereon, the apparatus comprising;
   endless conveyor means operable generally for discrete intermittent movements through a predetermined course therefor with a preselected dwell period between each of the discrete intermittent movements of said endless conveyor means, respectively;
   means operable generally for driving said endless conveyor means and including means associated with said driving means and movable for coupling in engagement with a confronting part of said endless conveyor means during the preselected dwell periods thereof, and means selectively operable for intermittently moving said driving means to impart to said endless conveyor means the discrete intermittent movements thereof only when said coupling means are in the engagement thereof with said confronting part of said endless conveyor means, respectively;
   at least one set of means rotatably associated with said endless conveyor means and conjointly movable therewith for carrying the cores;
   at least one set of means operable generally for dispensing the liquid adhesive material onto at least one of the opposite end turn groupings of the winding means of the cores disposed on some of said carrying means only during the preselected dwell periods of said endless conveyor means, respectively; and
   at least a pair of sets of means for effecting the rotation in one direction of some of said some carrying means and the rotation in another direction opposite the one direction of others of said some carrying means at least during the preselected dwell period of said endless conveyor means, respectively.

32. Apparatus as set forth in claim 31 further comprising means associated with said endless conveyor means during the preselected dwell periods thereof for retaining said endless conveyor means against movement opposite the discrete intermittent movements thereof.

33. Apparatus as set forth in claim 31 further comprising another like driving means for driving said endless conveyor means, said first named and another like driving means being conjointly movable in opposite directions to impart to said endless conveyor means the discrete intermittent movements thereof, respectively.

34. Apparatus as set forth in claim 31 further comprising means operable generally for obviating the operation of any one of said dispensing means in the event that any one of said carrying means is not carrying a core thereon.

35. Apparatus comprising:
    endless conveyor means operable generally for discrete intermittent movements through a predetermined course with a preselected dwell period between each discrete intermittent movement of said endless conveyor means, respectively; and
    at least one driving means movable between an at-rest position and a displaced position for effecting each discrete intermittent movement of said endless conveyor means, said at least one driving means including coupling means protractively movable for engaging a respective confronting part of said endless conveyor means during respective ones of the dwell periods when said at least one driving means is in its at-rest position and retractively movable for disengaging said respective confronting part upon the movement of said at least one driving means from its at-rest position to its displaced position effecting a respective one of the discrete intermittent movements of said endless conveyor means.

36. Apparatus as set forth in claim 35 further comprising means operable generally for moving said at least one driving means from its at-rest position to its displaced position only when said coupling means is engaged with said respective confronting part and for moving said at least one driving means from its displaced position to its at-rest position only when said coupling means is disengaged from said respective confronting part.

37. Apparatus as set forth in claim 35 further comprising at least another coupling means protractively movable for engaging another respective confronting part of said endless conveyor means when said at least one driving means is in its displaced position and for disengaging said another respective confronting part when said at least one driving means is in its at-rest position with said first named coupling means engaging a successive respective confronting part of said endless conveyor means.

38. Apparatus as set forth in claim 35 further comprising at least one means urged toward engagement with said endless conveyor means for preventing retrograde movement of said endless conveyor means.

39. Apparatus as set forth in claim 35 further comprising at least one set of means associated with said endless conveyor means and conjointly movable therewith for carrying a set of cores each having winding means with a pair of opposite end turn groupings thereof, respectively.

40. Apparatus as set forth in claim 39 further comprising at least one set of means operable generally for dispensing a hardenable liquid adhesive material onto at least one of the opposite end turn groupings of the winding means of the cores carried on at least some of said carrying means only during the preselected dwell periods of said endless conveyor means.

41. Apparatus as set forth in claim 40 further comprising at least a pair of sets of means for effecting the rotation in one direction of some of said at least some carrying means and the rotation in another direction opposite the one direction of others of said at least some carrying means at least during the preselected dwell periods of said endless conveyor means, respectively.

42. Apparatus as set forth in claim 40 further comprising means operable generally for obviating the operation of any one of said dispensing means in the event that any one of said carrying means is not carrying one of the cores thereon.

43. Apparatus adapted to treat with a hardenable liquid adhesive material a plurality of cores each having winding means with a pair of opposite end turn groupings thereon, the apparatus comprising:
    endless conveyor means operable generally for discrete intermittent movements between a plurality of preselected indexed positions defined in a predetermined course of said endless conveyor means;
    at least one set of means rotatably arranged on said endless conveyor means and conjointly movable therewith between the preselected indexed positions for carrying the cores, respectively;
    at least one set of means arranged at some of preselected indexed positions of said endless conveyor means and operable generally for dispensing the liquid adhesive material onto at least one of the opposite end turn groupings of the winding means of the cores upon the movement of said carrying means into the some preselected indexed positions, respectively;
    means operable for preventing the operation of any one of said dispensing means at any one of the some preselected indexed positions in the event that one of said carrying means without a core thereon is moved into the any one of the some preselected indexed positions;
    a set of means operable generally for effecting the rotation of said carrying means in one direction at some of the some preselected indexed positions and in another direction at others of the some preselected indexed positions at least upon the movement of said carrying means into the some preselected indexed positions, respectively; and
    means operable generally for adjusting the rotational speeds of said carrying means to maintain the rotation speeds constant between the some preselected indexed positions thereby to compensate for the discrete intermittent movements of said endless conveyor means, respectively.

44. Apparatus as set forth in claim 43 further comprising at least one set of means operable generally for driving said endless conveyor means with the discrete intermittent movements thereof between the preselected indexed positions, said driving means including a set of means protractively movable for coupling in engagement with confronting parts on said endless conveyor means only when said carrying means are in the preselected indexed positions and said driving means being operable only when said coupling means are in the engagements thereof with said confronting parts of said endless conveyor means, respectively.

45. Apparatus comprising:

endless conveyor means operable generally for discrete intermittent movement between a plurality of preselected indexed positions defined in a predetermined course of said endless conveyor means;

at least one set of means rotatably arranged on said endless conveyor means and conjointly movable therewith between the preselected indexed positions for carrying a set of cores, respectively;

means operable generally for effecting the rotation of said carrying means at some of the preselected indexed positions; and means operable generally for adjusting the rotational speeds of said carrying means to maintain the rotational speeds at least generally constant between the some preselected indexed positions thereby to compensate for the discrete intermittent movements of said endless conveyor means, respectively.

46. Apparatus as set forth in claim 45 wherein said rotation effecting means includes a set of means for rotating said carrying means in one direction at some of the some preselected indexed positions, and a set of other means for rotating said carrying means in another direction opposite the one direction at others of the some preselected indexed positions, respectively.

47. Apparatus as set forth in claim 46 wherein said adjusting means includes means operable generally for simultaneously increasing the rotational speed of one of said first named and other rotating means and decreasing the rotation speed of the other of said first named and other rotating means.

48. Apparatus as set forth in claim 45 wherein each core has winding means with a pair of opposite end turn groupings thereon and wherein the apparatus further comprises at least one set of means at the some preselected indexed positions and operable generally for dispensing a hardenable liquid adhesive material onto at least one of the opposite end turn groupings when said carrying means are in the some preselected indexed positions, respectively.

49. Apparatus as set forth in claim 48 further comprising means operable generally for obviating the operation of any one of said dispensing means at any one of the some preselected indexed positions in the event one of said carrying means without one of the cores thereon is moved into the any one of the some preselected indexed positions.

50. Apparatus adapted to dispense a hardenable liquid adhesive material from a source thereof, the apparatus comprising:

a set of means for receiving the liquid adhesive material from the source, respectively;

a set of means movable in said receiving means and operable generally for displacing from said receiving means at least some of the liquid adhesive material, respectively;

means operable generally for conjointly moving said displacing means to effect the operations thereof; and a set of means carried on said conjointly moving means in releasable engagement with said displacing means and selectively operable in response to the occurrence of a preselected condition for releasing at least one of said displacing means thereby to obviate the operation of said at least one displacing means in response to the actuation of said conjointly moving means, respectively.

* * * * *